United States Patent
Nakayama et al.

(10) Patent No.: US 9,418,772 B2
(45) Date of Patent: *Aug. 16, 2016

(54) BINDER RESIN COMPOSITION FOR ELECTRODE, ELECTRODE MIXTURE PASTE, AND ELECTRODE

(75) Inventors: Takeshige Nakayama, Yamaguchi (JP); Tomonori Nakayama, Yamaguchi (JP); Seiichirou Takabayashi, Yamaguchi (JP); Tetsuji Hirano, Chiba (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 936 days.

This patent is subject to a terminal disclaimer.

(21) Appl. No.: 13/394,815

(22) PCT Filed: Sep. 22, 2010

(86) PCT No.: PCT/JP2010/066419
§ 371 (c)(1),
(2), (4) Date: Mar. 8, 2012

(87) PCT Pub. No.: WO2011/040308
PCT Pub. Date: Apr. 7, 2011

(65) Prior Publication Data
US 2012/0168688 A1    Jul. 5, 2012

(30) Foreign Application Priority Data

Sep. 30, 2009 (JP) .................. 2009-227911
Sep. 30, 2009 (JP) .................. 2009-227912
Sep. 30, 2009 (JP) .................. 2009-227913

(51) Int. Cl.
| | | |
|---|---|---|
| H01B 1/22 | (2006.01) | |
| H01M 4/00 | (2006.01) | |
| H01G 11/30 | (2013.01) | |
| H01G 11/38 | (2013.01) | |
| H01M 4/133 | (2010.01) | |
| H01M 4/134 | (2010.01) | |
| H01M 4/1393 | (2010.01) | |
| H01M 4/1395 | (2010.01) | |
| H01M 4/62 | (2006.01) | |
| H01M 10/0525 | (2010.01) | |
| H01G 11/28 | (2013.01) | |

(52) U.S. Cl.
CPC .............. *H01B 1/22* (2013.01); *H01G 11/28* (2013.01); *H01G 11/30* (2013.01); *H01G 11/38* (2013.01); *H01M 4/133* (2013.01); *H01M 4/134* (2013.01); *H01M 4/1393* (2013.01); *H01M 4/1395* (2013.01); *H01M 4/622* (2013.01); *H01M 10/0525* (2013.01); *Y02E 60/122* (2013.01); *Y02E 60/13* (2013.01)

(58) Field of Classification Search
CPC .............. H01B 1/00; H01B 1/22; H01B 1/24; H01M 4/622; H01M 4/625
See application file for complete search history.

(56) References Cited

U.S. PATENT DOCUMENTS

| | | | |
|---|---|---|---|
| 6,001,507 A | 12/1999 | Ono et al. | |
| 6,083,426 A * | 7/2000 | Shimasaki et al. | ........... 252/500 |
| 8,110,652 B2 * | 2/2012 | Bito et al. | .................. 528/353 |
| 8,221,842 B2 | 7/2012 | Kim et al. | |
| 8,426,029 B2 | 4/2013 | Kim et al. | |
| 2010/0130628 A1 * | 5/2010 | Yamaguchi | ........ C08G 73/1007 |
| | | | 521/60 |

FOREIGN PATENT DOCUMENTS

| | | | | |
|---|---|---|---|---|
| JP | 06-275279 | | 9/1994 | |
| JP | H06-275928 | | 9/1994 | |
| JP | H10-188992 | | 7/1998 | |
| JP | 2000-021412 | * | 1/2000 | ............. H01M 4/62 |
| JP | 2000-195553 | | 7/2000 | |
| JP | 2001-345103 | | 12/2001 | |
| JP | 2002-008664 | | 1/2002 | |
| JP | 2004-079286 | | 3/2004 | |
| JP | 2006-313819 | | 11/2006 | |
| JP | 2007-149604 | | 6/2007 | |
| JP | 2008-010307 | | 1/2008 | |
| JP | 2008-034352 | | 2/2008 | |
| JP | 2008-084832 | | 4/2008 | |
| JP | 2008-135384 | | 6/2008 | |
| JP | 2010-188992 | | 9/2010 | |
| WO | 2004/004031 | | 1/2004 | |
| WO | 2007102691 | | 9/2007 | |
| WO | 2008010494 | | 1/2008 | |
| WO | 2008/105036 | | 9/2008 | |
| WO | 2008120787 | | 10/2008 | |
| WO | WO 2008/120787 | * | 10/2008 | ............. C08G 73/10 |
| WO | 2009/063801 | | 5/2009 | |
| WO | 2009/113585 | | 9/2009 | |
| WO | WO 2010/050491 | * | 5/2010 | ............. C08L 79/08 |

OTHER PUBLICATIONS

International Search Report—PCT/JP2010/066419—Dec. 14, 2010.

* cited by examiner

*Primary Examiner* — Mark Kopec
(74) *Attorney, Agent, or Firm* — Young & Thompson

(57) ABSTRACT

The present invention relates to a binder resin composition for an electrode, including a polyamic acid and a solvent, wherein the polyamic acid is (i) a polyamic acid which includes a tetracarboxylic acid component including 10 to 100 mol % of 4,4'-oxydiphthalic acid and 90 to 0 mol % of 3,3',4,4'-biphenyltetracarboxylic acid and/or pyromellitic acid and a diamine component including an aromatic diamine having 1 to 4 aromatic rings, (ii) a polyamic acid which includes a tetracarboxylic acid component including 3,3',4,4'-biphenyltetracarboxylic acid dianhydride and a diamine component including 10 to 90 mol % of p-phenylene diamine and 90 to 10 mol % of 4,4'-diaminodiphenyl ether, or (iii) a polyamic acid which includes a tetracarboxylic acid component including 3,3',4,4'-biphenyltetracarboxylic acid dianhydride and a diamine component including 40 mol % or more of a bis[4-(4-aminophenoxy)phenyl] compound.

15 Claims, No Drawings

BINDER RESIN COMPOSITION FOR ELECTRODE, ELECTRODE MIXTURE PASTE, AND ELECTRODE

TECHNICAL FIELD

The present invention relates to a binder resin composition for an electrode of an electrochemical element like a lithium ion secondary battery and an electric double layer capacitor, electrode mixture paste containing the binder resin composition, and an electrode manufactured by using the electrode mixture paste.

BACKGROUND ART

As having high energy density and high capacity, a lithium ion secondary battery is widely used as a power supply for driving a mobile information terminal or the like. In recent days, it is also used for an industrial application like mounting in an electric • hybrid automobile or the like wherein high capacity is needed, and therefore studies to achieve even higher capacity and higher performance are carried out. One of the studies is to increase charge and discharge capacity by using silicon or tin as a negative electrode active material having a great lithium occlusion amount per unit volume, or an alloy containing them.

However, when silicon, tin, or an alloy containing them, which are an active material having high charge and discharge capacity, is used, a great volume change in the active material is caused in accordance with charge and discharge. As such, an electrode using polyfluorovinylidene or rubber-based resin as a binder resin, that have been widely used for an electrode in which carbon is used as an active material, has a problem that the active material layer is easily degraded or peeling occurs at an interface between a current collector and the active material so that the current collecting structure within the electrode is destructed and electron conductivity of the electrode is lowered, and as a result, the cycle property of the battery is easily deteriorated.

For such reasons, a binder resin composition which hardly undergoes any destruction or peeling of an electrode even under a significantly high volume change and has high toughness under battery environment has been waited for.

As disclosed in Patent Literature 1, use of a polyimide resin as a binder for an electrode of a lithium ion secondary battery is well known.

It is suggested in Patent Literatures 2 and 3 to use binder resins each having a certain mechanical property for an active material consisting of a silicon alloy or an alloy containing tin. However, specific chemical structures of the resins are not disclosed.

In Patent Literature 4, a lithium secondary battery including an active material which consists of silicon and silicon-based alloy and a polyimide resin having a specified chemical structure used as a binder is suggested. The polyimide resin is polyimide having a residue of 3,3',4,4'-benzophenone tetracarboxylic acid.

Meanwhile, it is described in Non Patent Literature 1 that lower swelling degree of a binder resin for an electrode in an electrolyte solution yields higher discharge capacity retention ratio according to charge and discharge cycle, and therefore desirable.

Further, in Non Patent Literature 2, the reductive decomposition of an electrolyte solution within a lithium battery is studied and generation of methoxy lithium and the like on surface of the electrode is shown. Thus, under battery environment, methoxy lithium having a strong alkali property and a potentially negative effect on the binder resin is included in the electrolyte solution.

CITATION LIST

Patent Literature

Patent Literature 1: Japanese Patent Application Laid-Open (JP-A) No. 6-163031
Patent Literature 2: WO2004/004031
Patent Literature 3: JP-A No. 2007-149604
Patent Literature 4: JP-A No. 2008-34352

Non Patent Literature

Non Patent Literature 1: HITACHI CHEMICAL TECHNICAL REPORT Vol. 45 (July, 2005)
Non Patent Literature 2: YOSHIDA HIROAKI and others, Decomposition Reaction of Electrolyte Solution Mixed with Carbonate Ester Used for Lithium Battery, THE 35th BATTERY SYMPOSIUM IN JAPAN, Lecture Summary, THE COMMITTEE OF BATTERY TECHNOLOGY, THE ELECTROCHEMICAL SOCIETY OF JAPAN, Nov. 14, 1994, p. 75 to 76

SUMMARY OF INVENTION

Technical Problem

Object of the invention is to provide a binder resin composition for an electrode having novel chemical structure, wherein the binder resin has low degree of swelling and can maintain excellent toughness even under battery environment.

Solution to Problem

As a result of extensive studies, inventors of the present invention found that, by using a resin composition having a specified chemical structures, a novel binder resin composition for an electrode which has low degree of swelling and excellent toughness (high breaking elongation and high breaking energy) even under battery environment can be obtained, and the invention was completed accordingly.

Specifically, the invention relates to a binder resin composition, electrode mixture paste, and an electrode that are described below.

A binder resin composition for an electrode, comprising a polyamic acid which comprises a repeating unit represented by chemical formula (1) below and a solvent, wherein A and B in the following chemical formula (1) of the polyamic acid are (i), (ii), or (iii) described below:

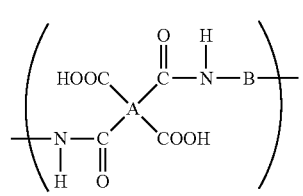

Chemical Formula (1)

(i) 10 to 100 mol % of A is a tetravalent group represented by chemical formula (2) below, 90 to 0 mol % of A is a tetravalent group represented by chemical formula (3) and/or chemical formula (4) below, and B is a divalent group having 1 to 4 aromatic ring, (ii) A is a tetravalent group represented by the chemical formula (3) below, 10 to 90 mol % of B is a divalent group represented by chemical formula (6) below, and 90 to 10 mol % of B is a divalent group represented by chemical formula (5) below, and (iii) A is a tetravalent group represented by the chemical formula (3) below and 40 mol % or more of B is a divalent group represented by chemical formula (7) below,

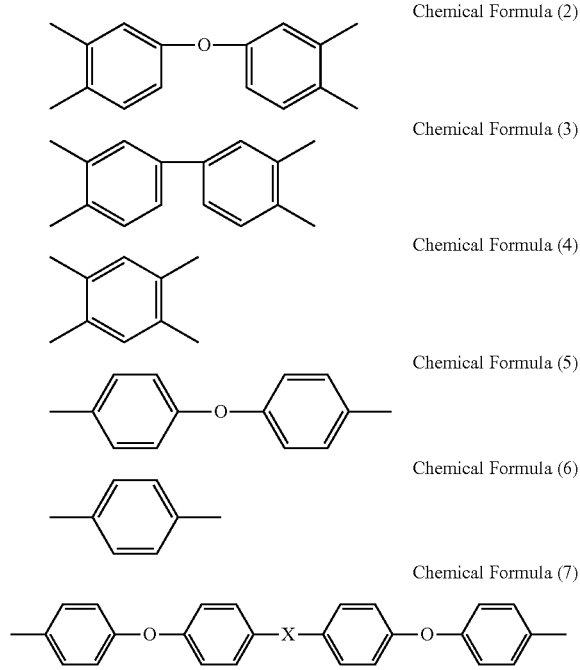

Chemical Formula (2)

Chemical Formula (3)

Chemical Formula (4)

Chemical Formula (5)

Chemical Formula (6)

Chemical Formula (7)

with the proviso that, in the chemical formula (7), X represents any one of a direct bond, an oxygen atom, a sulfur atom, a methylene group, a carbonyl group, a sulfoxy group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfone diphenoxy group.

An electrode mixture paste including an electrode active material and the binder resin composition for an electrode.

An electrode obtained by coating the electrode mixture paste according to an embodiment on a current collector and carrying out an imidization reaction while simultaneously removing the solvent by heating.

DESCRIPTION OF EMBODIMENTS

The binder resin composition for an electrode of the invention contains a polyamic acid having a repeating unit represented by the chemical formula (1) and a solvent. The polyamic acid can be easily produced by using a tetracarboxylic acid component and a diamine component.

First, the tetracarboxylic acid component and diamine component of the polyamic acid wherein A and B in the chemical formula (1) are the same as (i) described above are described (herein below, referred to as the first polyamic acid).

Examples of the tetracarboxylic acid component include tetracarboxylic acids, i.e., tetracarboxylic acid, acid dianhydrides and esters thereof. Preferably, it is dianhydride. Examples of the diamine component include diamines, i.e., diamine and diisocyanate, and preferably diamine. All of them can be used as a tetracarboxylic acid component or a diamine component of a polyimide.

The tetracarboxylic acid component which constitutes the first polyamic acid consists of 10 to 100 mol %, preferably 15 to 70 mol %, and more preferably 20 to 50 mol % of 4,4'-oxydiphthalic acids and 90 to 0 mol %, preferably 85 to 30 mol %, and more preferably 80 to 50 mol % of 3,3',4,4'-biphenyltetracarboxylic acids and/or pyromellitic acids in 100 mol % of the entire tetracarboxylic acid components.

The diamine component which constitutes the first polyamic acid is aromatic diamines containing 1 to 4 aromatic rings, and specific examples thereof include an aromatic diamine having one aromatic ring like p-phenylenediamine, m-phenylenediamine, 2,4-diaminotoluene, 2,4-bis(β-amino-tert-butyl)toluene, bis-p-(1,1-dimethyl-5-aminopentyl)benzene, 1-isopropyl-2,4-m-phenylenediamine, m-xylylenediamine, and p-xylylenediamine, an aromatic diamine having two aromatic rings like 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, bis(4-amino-3-carboxyphenyl)methane, and bis(p-β-amino-tert-butylphenyl)ether, an aromatic diamine having three aromatic rings like 1,3-bis(4-aminophenoxy)benzene, 1,4-bis(4-aminophenoxy)benzene and bis(p-β-methyl-6-aminophenyl)benzene, an aromatic diamine having four aromatic rings like 2,2-bis[4-(4-aminophenoxy)phenyl]propane, bis[4-(4-aminophenoxy)phenyl]sulfone, and 4,4'-bis(4-aminophenoxy)biphenyl, and aromatic diisocyanate having 1 to 4 aromatic rings which correspond to the diamines.

Further, preferred examples of the aromatic diamines having four aromatic rings include the aromatic diamine represented by the following chemical formula (9) and aromatic diisocyanate having 4 aromatic rings corresponding aromatic rings.

Chemical Formula (9)

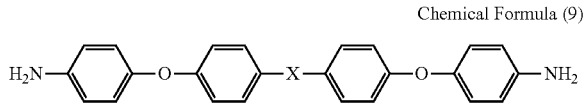

with the proviso that, in the chemical formula (9), X represents any one of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfone diphenoxy group.

As a diamine component which constitutes the first polyamic acid, p-phenylenediamine, 4,4'-diamino diphenyl ether, 2,2-bis[4-(4-aminophenoxy)phenyl]propane, bis[4-(4-aminophenoxy)phenyl]sulfone, 4,4'-bis(4-aminophenoxy)biphenyl, and diisocyanate which corresponds to the diamines are particularly preferable among those described above.

Next, the tetracarboxylic acid component and diamine component of the polyamic acid wherein A and B in the chemical formula (1) are the same as (ii) described above are described (herein below, referred to as the second polyamic acid).

Examples of the tetracarboxylic acid component which constitutes the second polyamic acid is substantially obtained by using 3,3',4,4'-biphenyltetracarboxylic acid dianhydride or derivatives like hydrolyzates and esters thereof. Within the range in which the effect of the invention is obtained, a small amount of other tetracarboxylic acid component can be also used. However, its use amount is, with respect to the entire tetracarboxylic acid component, 10 mol % or less, preferably 5 mol % or less, and more preferably 0 mol %.

The diamine component which constitutes the second polyamic acid is obtained by using 10 to 90 mol %, preferably 20 to 80 mol %, and more preferably 30 to 70 mol % of p-phenylene diamine and 90 to 10 mol %, preferably 80 to 20 mol %, and more preferably 70 to 30 mol % of 4,4'-diaminodiphenyl ether. Since the polyimide resin obtained within this range has a small degree of swelling in an electrolyte solution, high breaking strength, and high breaking energy, it is extremely suitable as a binder resin for an electrode. In addition, within the range in which the effect of the invention is obtained, a small amount of other tetracarboxylic acid component can be also used. However, its use amount is, with respect to the entire tetracarboxylic acid component, 10 mol % or less, preferably 5 mol % or less, and more preferably 0 mol %.

Next, the tetracarboxylic acid component and diamine component of the polyamic acid wherein A and B in the chemical formula (1) are the same as (iii) described above are described (herein below, referred to as the third polyamic acid).

Examples of the tetracarboxylic acid component which constitutes the third polyamic acid is substantially obtained by using 3,3',4,4'-biphenyltetracarboxylic acid dianhydride or derivatives like hydrolyzates and esters thereof. Within the range in which the effect of the invention is obtained, a small amount of other tetracarboxylic acid component can be also used. However, its use amount is, with respect to the entire tetracarboxylic acid component, 10 mol % or less, preferably 5 mol % or less, and more preferably 0 mol %.

40 mol % or more of the diamine component which constitutes the third polyamic acid is an aromatic diamine represented by the chemical formula (9) above. When the aromatic amine is less than 40 mol %, it is difficult to obtain a binder resin having a small degree of swelling and excellent toughness (high breaking strength and high breaking energy) in a battery environment.

Examples of the aromatic diamine represented by the chemical formula (9), which constitutes the third polyamic acid, include, although not specifically limited, 2,2-bis[4-(4-aminophenoxy)phenyl]propane, 4,4'-bis(4-aminophenoxy)biphenyl, bis[4-(4-aminophenoxy)phenyl]sulfone, 2,2-bis[4-(4-aminophenoxy)phenyl]hexafluoropropane, and bis[4-(4-aminophenoxy)phenyl] ketone. The aromatic diamine may be used either singly or in a mixture of two or more.

Of these, 2,2-bis[4-(4-aminophenoxy)phenyl]propane can be particularly preferably used.

Preferably, 50 to 100 mol %, and particularly preferably 70 to 100 mol % of the diamine component which constitutes the third polyamic acid consists of an aromatic diamine represented by the chemical formula (9), and 50 to 0 mol %, and particularly 30 to 0 mol % thereof is an aromatic diamine represented by chemical formula (10) and/or chemical formula (11).

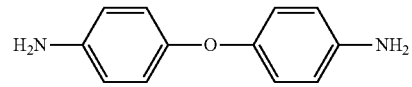

Chemical Formula (10)

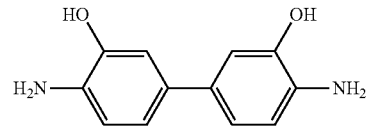

Chemical Formula (11)

Since the polyimide resin obtained within this range has a small degree of swelling in an electrolyte solution, high breaking strength, and high breaking energy, the diamine component which constitutes the third polyamic acid is more preferable as a binder resin for an electrode. In addition, within the range in which the effect of the invention is obtained, a small amount of other tetracarboxylic acid component can be also used. However, its use amount is, with respect to the entire tetracarboxylic acid component, 10 mol % or less, preferably 5 mol % or less, and more preferably 0 mol %.

As the polyimide resin obtained by using a polyamic acid having a specified chemical structure, wherein the tetracarboxylic acid component and diamine component described above are contained, has low degree of swelling, high breaking elongation, high breaking energy, and high retention ratio even under a battery environment in which an electrolyte solution or the like is present, the binder resin composition for an electrode of the invention can be suitably used as a binder resin for an electrode having excellent toughness (high breaking elongation and high breaking energy).

It is important that the molar ratio between the tetracarboxylic acid component and the diamine component [tetracarboxylic acid component/diamine component] which constitute the polyamic acid of the invention (including the first polyamic acid, the second polyamic acid, and the third polyamic acid) is close to 1, i.e., it falls within the range of 0.95 to 1.05, and preferably 0.97 to 1.03. The polyimide resin obtained from outside the molar region may have lowered toughness.

The polyamic acid can be easily produced by reacting the diamine component and the tetracarboxylic acid component in a solvent. Although not specifically limited, the production can be suitably carried out by adding the tetracarboxylic acid component all at once or in several steps to a solution in which the diamine component is dissolved in a solvent, followed by stirring. The reaction temperature is preferably 10° C. to 60°

C., more preferably 15° C. to 55° C., and particularly preferably 15° C. to 50° C. When the reaction temperature is lower than 10° C., it is undesirable in that the reaction is slowed down. On the other hand, when the reaction temperature is higher than 60° C., it is also undesirable in that viscosity of the solution may be lowered. The reaction time is preferably 0.5 hours to 72 hours, more preferably 1 hr to 60 hours, and particularly preferably 1.5 hours to 48 hours. When the reaction time is shorter than 0.5 hours, only an incomplete reaction is obtained and the viscosity of the synthesized polyamic acid solution may be unstable. Meanwhile, from the viewpoint of productivity, it is undesirable to have production time of 72 hours or more.

For the production of polyamic acid, an organic solvent that is well known in the art as a solvent for producing polyamic acids can be also used. Examples thereof include N,N-dimethyl formamide, N,N-dimethyl acetamide, N,N-diethyl acetamide, N-methyl-2-pyrrolidone, N-ethyl-2-pyrrolidone, 1,3-dimethyl-2-imidazolidinone, N-methylcaprolactam, hexamethyl phosphorotriamide, 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, dimethyl sulfoxide, dimethylsulfone, diphenyl ether, sulfolane, diphenylsulfone, tetramethyl urea, anisole, m-cresol, phenol, and γ-butyrolactone. The solvent may be used either singly or in a mixture of two or more. Of these, from the viewpoint of solubility of the polyamic acid and safety, N,N-dimethyl acetamide, N,N-diethyl acetamide, N-methyl-2-pyrrolidone, N-ethyl-2-pyrrolidone, 1,3-dimethyl-2-imidazolidinone, and γ-butyrolactone are preferable. N-methyl-2-pyrrolidone, N-ethyl-2-pyrrolidone, and γ-butyrolactone are particularly preferable.

The binder resin composition for an electrode of the invention is obtained by homogeneously dissolving the polyamic acid in a solvent. Regarding the binder resin composition, the composition in which concentration of solid matter derived from polyamic acid is greater than 5% by mass but the same or less than 45% by mass, preferably greater than 10% by mass but the same or less than 40% by mass, and more preferably greater than 15% by mass but the same or less than 30% by mass with respect to the total amount of polyamic acid and solvent can be suitably used. When the concentration of solid matter derived from polyamic acid is less than 5% by mass, viscosity of the solution may be excessively lowered. On the other hand, when it is greater than 45% by mass, the fluidity of the solution may be compromised. Regarding the viscosity of the solution, the viscosity of the solution at 30° C. is preferably 1000 Pa·sec or less, more preferably 0.5 to 500 Pa·sec, still more preferably 1 to 300 Pa sec, and particularly 3 to 200 Pa·sec.

When the viscosity of the solution is greater than 1000 Pa·sec, it is difficult to achieve mixing of electrode active material powder or homogeneous coating on a current collector. On the other hand, when it is lower than 0.5 Pa·sec, sagging or the like occurs during mixing of electrode active material powder or coating on a current collector, and therefore toughness of the polyimide resin may be lowered after the resin is dried under heating and imidated.

The polyamic acid used for producing the binder resin composition for an electrode of the invention can be used after it is isolated by precipitating a polyamic acid solution, which is obtained by reacting the diamine component and tetracarboxylic acid component in a solvent, in a poor solvent (and dissolving it again in a pre-determined solvent), or it may be used as it is after it is produced without isolating a polyamic acid solution or after it is briefly diluted. From the viewpoint of productivity and cost, it is preferably used as it is without isolating the polyamic acid solution obtained.

As a solvent used for the binder resin composition for an electrode of the invention, an organic solvent which is conventionally known to dissolve polyamic acid can be suitably used. An organic polar solvent having boiling point of 300° C. or less at atmospheric pressure is preferable. The solvent used for production of the polyamic acid can be also suitably used.

From the viewpoint of decreasing the degree of swelling of a polyimide resin obtained in an electrolyte solution, increasing breaking elongation and breaking energy, and lowering heating temperature for obtaining an electrode, the binder resin composition for an electrode of the invention preferably contains pyridine compounds.

The pyridine compounds are a compound which has a pyridine skeleton in the chemical structure, and preferred examples thereof include pyridine, 3-pyridinol, quinoline, isoquinoline, quinoxaline, 6-tert-butyl quinoline, acridine, 6-quinoline carboxylic acid, 3,4-lutidine, and pyridazine. These pyridine compounds can be used either singly or in a combination of two or more.

Addition amount of the pyridine compounds in the binder resin composition for an electrode is, although not specifically limited, preferably 0.05 to 2.0 molar equivalents, and more preferably 0.1 to 1.0 molar equivalents with respect to amic acid structure of the polyamic acid (i.e., per mol of the amic acid structure). When the addition amount is not within the range, the effect of adding a pyridine compound, i.e., decreasing the degree of swelling of a polyimide resin in an electrolyte solution, increasing breaking elongation and breaking energy, and lowering heating temperature for obtaining an electrode, may not be easily obtained, and therefore undesirable.

The binder resin composition for an electrode of the invention is easily converted to a polyimide resin by heating or chemical treatment using an imidization agent or the like. For example, when the binder resin composition for an electrode is flow-casted or coated on a substrate followed by heating and drying at the temperature range of 120° C. to 180° C., and the self-supporting film is released from the substrate followed by fixing on a metal frame or the like and further heated at 200° C. to 400° C. for 5 minutes to 10 hours, a polyimide resin film can be suitably obtained.

By heating the binder resin composition for an electrode of the invention described above, weight of the polyimide resin is increased by preferably 3% by mass or less, more preferably 2% by mass or less, and still more preferably 1% by mass or less when it is impregnated in dimethyl carbonate for 24 hours at 25° C., and therefore it can be suitably used as a binder resin composition for an electrode.

Further, according to the binder resin composition for an electrode of the invention in which the first polyamic acid is used as polyamic acid, the polyimide resin obtained by heating as described above has excellent toughness, i.e., tensile energy to break is 70 MJ/m$^3$ or more, more preferably 90 MJ/m$^3$ or more, still more preferably 110 MJ/m$^3$ or more, and particularly preferably 130 MJ/m$^3$ or more, retention ratio of the tensile energy to break after impregnating in dimethyl carbonate for 24 hours at 25° C. is 70% or more, more preferably 80% or more, and still more preferably 85% or more, and retention ratio of the tensile energy to break after impregnating in methoxy lithium-containing methanol solution for 24 hours at 25° C. is 70% or more, more preferably 80% or more, and still more preferably 85% or more, and therefore it can be suitably used as a binder resin composition for an electrode.

Further, according to the binder resin composition for an electrode of the invention in which the second polyamic acid is used as polyamic acid, the polyimide resin obtained by heating as described above has excellent toughness, i.e., tensile energy to break is 100 MJ/m$^3$ or more, more preferably 110 MJ/m$^3$ or more, and still more preferably 120 MJ/m$^3$ or more, retention ratio of the tensile energy to break after impregnating in dimethyl carbonate for 24 hours at 25° C. is 70% or more, more preferably 75% or more, and still more preferably 80% or more, and therefore it can be suitably used as a binder resin composition for an electrode.

Further, according to the binder resin composition for an electrode of the invention in which the third polyamic acid is used as polyamic acid, the polyimide resin obtained by heating as described above has excellent toughness, i.e., tensile energy to break is 50 MJ/m$^3$ or more, more preferably 60 MJ/m$^3$ or more, and still more preferably 70 MJ/m$^3$ or more, retention ratio of the tensile energy to break after impregnating in dimethyl carbonate for 24 hours at 25° C. is 70% or more, more preferably 75% or more, and still more preferably 80% or more, and retention ratio of the tensile energy to break after impregnating in methoxy lithium-containing methanol solution for 24 hours at 25° C. is 60% or more, more preferably 65% or more, and still more preferably 70% or more, and therefore it can be suitably used as a binder resin composition for an electrode.

Dimethyl carbonate is a compound commonly used as a component of an electrolyte solution for an electrode, and it often contains methoxy lithium under an electrode environment. Further, when the weight increase of the binder resin in an electrolyte solution that is caused by swelling in an electrolyte solution (when impregnated for 24 hours at 25° C.) is 5% by mass or less, more preferably 3% by mass or less, and particularly preferably 2% by mass or less, the influence of a change in electrode volume can be easily inhibited. The polyimide resin obtained from the binder resin composition for an electrode of the invention has weight increase of preferably 5% by mass or less, more preferably 3% by mass or less, and particularly preferably 2% by mass or less even in an electrolyte solution containing methoxy lithium.

Although not specifically limited, by adding at least an electrode active material to the binder resin composition for an electrode of the invention preferably in the temperature range of 10° C. to 60° C., electrode mixture paste can be suitably produced. As an electrode active material, a material well known in the art may be used. Metal complex oxide containing lithium, carbon powder, silicon powder, tin powder, or powder of an alloy containing silicon or tin is preferable. The amount of the electrode active material in electrode mixture paste is, although not specifically limited, generally 0.1 to 1000 times, preferably 1 to 1000 times, more preferably 5 to 1000 times, and still more preferably 10 to 1000 times the amount of the solid matter derived from polyamic acid based on the mass. When the amount of the active material is too small, many inactive spots are generated on the active material layer formed on a current collector, and therefore a sufficient electrode function may not be obtained. On the other hand, when the amount of the active material is too high, the active material does not fully bind to a current collector and it may be easily desorbed. Further, if necessary, an additive like surface active agent, viscosity modifying agent, or conductive aid may be added to the electrode mixture paste. Further, it is preferable that the solid matter derived from the polyamic acid is added to occupy 1 to 15% by mass of the total solid matter of the paste. If it is not within this range, function of the electrode may be deteriorated.

By flow-casting or coating the electrode mixture paste capable of reversibly adding • releasing lithium ions by charge and discharge, that is obtained by using an electrode active material like metal complex oxide containing lithium, on an electroconductive current collector like aluminum, and heating the flow-casting or coating electrode mixture paste in the temperature range of 80 to 400° C., more preferably 120 to 380° C., and particularly preferably 150 to 350° C. to remove solvent and to cause imidization, an electrode can be produced.

When the heating temperature is not within the range, the imidization reaction may not be obtained at sufficient level or a molded electrode may exhibit poor physical properties. The heating may be carried out in several steps to prevent foaming or powdering. The heating time is preferably in the range of 3 minutes to 48 hours. From the viewpoint of productivity, 48 hours or more is undesirable. On the other hand, when it is shorter than 3 minutes, it is also undesirable in that the imidization reaction or solvent removal is insufficient.

The electrode obtained can be particularly preferably used as a positive electrode of a lithium ion secondary battery.

By flow-casting or coating the electrode mixture paste capable of reversibly adding • releasing lithium ions by charge and discharge, that is obtained by using an electrode active material like carbon powder, silicon powder, tin powder, or powder of an alloy containing silicon or tin, on an electroconductive current collector like copper, and carrying out an imidization reaction simultaneously by heating in the temperature range of 80 to 300° C., more preferably 120 to 280° C., and particularly preferably 150 to 250° C. to remove solvent, an electrode can be produced. When the heating temperature is lower than 80° C., the imidization reaction may not be obtained at sufficient level to yield a molded electrode having poor physical properties. On the other hand, when the heating is carried out at the temperature higher than 300° C., it may not be used as an electrode because copper is deformed, etc. The heating may be carried out in several steps to prevent foaming or powdering. The heating time is preferably in the range of 3 minutes to 48 hours. From the viewpoint of productivity, 48 hours or more is undesirable. On the other hand, when it is shorter than 3 minutes, it is also undesirable in that the imidization reaction or solvent removal is insufficient.

The electrode obtained can be particularly preferably used as a negative electrode of a lithium ion secondary battery.

EXAMPLES

Herein below, the invention is described in greater detail in view of the Examples. However, the invention is not limited by the Examples.

Examples 1 to 12 are the examples in which the first polyamic acid is used. Examples 13 to 31 are the examples in which the second polyamic acid is used. Examples 32 to 51 are the examples in which the third polyamic acid is used.

Methods for measuring the characteristics as employed in the Examples are described below.

<Concentration of Solid Matter>

The sample solution (weight: w1) is subjected to heating using a hot air dryer at 120° C. for 10 minutes, 250° C. for 10 minutes, and 350° C. for 30 minutes. Weight after the heat treatment is then measured (weight: w2). The concentration of the solid matter [% by mass] is calculated by the following equation.

$$\text{Concentration of solid matter [\% by mass]} = (w2/w1) \times 100$$

<Inherent Viscosity>

The sample solution is diluted to have concentration of 0.5 g/dl (solvent: NMP) based on the concentration of solid matter. Flow time (T1) of the diluted solution is measured at 30° C. by using Cannon-Fenske No. 100. The inherent viscosity is calculated by using the flow time of NMP as a blank (T0) based on the following equation.

Inherent viscosity=[ln(T1/T0)]/0.5

<Solution Viscosity (Rotational Viscosity)>

The solution viscosity is measured at 30° C. by using type E viscometer manufactured by Tokimec, Inc.

<Solution Stability>

The binder resin composition for an electrode is stored in an atmosphere with temperature controlled at 25° C. After one month, a resin showing solution viscosity change of ±10% or less is labeled "o", and a resin showing solution viscosity change of more than ±10% is labeled "x".

<Mechanical and Physical Properties (Tensile Testing)>

Tensile testing is carried out by using a tensile tester (trade name: RTC-1225A, manufactured by Orientec Co., Ltd.) with reference to ASTM D882.

<Swelling Test>

A polyimide film made of the binder resin composition for an electrode is cut to 5 cm×5 cm (thickness: 50 μm) and used as a specimen. When the weight of the specimen after drying for 24 hours at 60° C. under vacuum is dry mass (Wd) and the swelling weight of the specimen after impregnation for 24 hours at 25° C. in a dimethyl carbonate solution or a 10% by mass methanol solution of methoxy lithium is swelling mass (Ww), degree of the swelling, i.e., S, is calculated by using the following equation.

$S$ [% by mass]=$(Ww-Wd)/Ww \times 100$

<Retention Ratio of Breaking Energy>

By using a specimen before and after the swelling test using a dimethyl carbonate solution or a 10% by mass methanol solution of methoxy lithium, a tensile testing is carried out and the retention ratio of breaking energy is calculated by using the following equation.

Retention ratio of breaking energy [%]=(Breaking energy after impregnation/Breaking energy before impregnation)×100

Abbreviations of the compounds that are used in the following examples are described below.
ODPA: 4,4'-oxydiphthalic acid dianhydride
s-BPDA: 3,3',4,4'-biphenyltetracarboxylic acid dianhydride
PMDA: pyromellitic acid dianhydride
PPD: p-phenylenediamine
ODA: 4,4'-diaminodiphenyl ether
BAPP: 2,2-bis[4-(4-aminophenoxy)phenyl]propane
BAPB: 4,4'-bis(4-aminophenoxy)biphenyl
BAPS: bis[4-(4-aminophenoxy)phenyl]sulfone
HAB: 4,4'-diamino-3,3'-dihydroxybiphenyl
NMP: N-methyl-2-pyrrolidone
DMAc: N,N-dimethyl acetamide Example 1

To a glass reaction vessel with internal volume of 500 mL that is equipped with a stirrer and an inlet • outlet for nitrogen gas, 400 g of NMP was added as a solvent. To the solvent, 25.85 g (0.239 mol) of PPD and 74.15 g (0.239 mol) of OPDA were added and the mixture was stirred for 10 hours at 50° C. to obtain a binder resin composition for an electrode which has a solid matter content of 18.1% by mass, solution viscosity of 4.9 Pa·s, and inherent viscosity of 0.75.

The binder resin composition for an electrode which has been obtained from the above was coated on a glass plate substrate by using a bar coater. The coated film was defoamed and pre-dried under reduced pressure for 30 minutes at 25° C., and was then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, 4.77 g of the binder resin composition for an electrode obtained (weight of the solid matter after imidization: 0.8 g) and 9.2 g of 300 mesh silicon powder were kneaded while being smashed in a mortar to produce electrode mixture paste. The obtained paste was able to be thinly coated on a copper foil by using a glass rod. The copper foil coated with the paste was fixed on a substrate and heated in nitrogen atmosphere for 1 hr at 120° C., 10 minutes at 200° C., 10 minutes at 220° C., 10 minutes at 250° C., 10 minutes at 300° C., and 10 minutes at 350° C. As a result, an electrode having an active material layer with a thickness of 100 μm was able to be produced appropriately.

Example 2

To a glass reaction vessel with internal volume of 500 mL that is equipped with a stirrer and an inlet • outlet for nitrogen gas, 400 g of NMP was added as a solvent. To the solvent, 39.23 g (0.196 mol) of ODA and 60.77 g (0.196 mol) of OPDA were added and the mixture was stirred for 10 hours at 50° C. to obtain a binder resin composition for an electrode which has a solid matter content of 18.3% by mass, solution viscosity of 5.2 Pa·s, and inherent viscosity of 0.78.

The binder resin composition for an electrode which has been obtained from the above was coated on a glass plate substrate by using a bar coater. The coated film was defoamed and pre-dried under reduced pressure for 30 minutes at 25° C., and was then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 1.

Further, the binder resin composition for an electrode which has been obtained from the above was treated in the same manner as the Example 1 to appropriately produce an electrode.

Example 3

To a glass reaction vessel with internal volume of 500 mL that is equipped with a stirrer and an inlet • outlet for nitrogen gas, 400 g of NMP was added as a solvent. To the solvent, 56.96 g (0.139 mol) of BAPP and 43.04 g (0.139 mol) of ODPA were added and the mixture was stirred for 10 hours at 50° C. to obtain a binder resin composition for an electrode which has a solid matter content of 18.5% by mass, solution viscosity of 5.0 Pa·s, and inherent viscosity of 0.74.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200°

C., 10 minutes at 250° C., and 10 minutes at 350° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 4

To a glass reaction vessel with internal volume of 500 mL that is equipped with a stirrer and an inlet • outlet for nitrogen gas, 400 g of NMP was added as a solvent. To the solvent, 25.95 g (0.240 mol) of PPD, 66.99 g (0.216 mol) of ODPA, and 7.06 g (0.024 mol) of s-BPDA were added and the mixture was stirred for 10 hours at 50° C. to obtain a binder resin composition for an electrode which has a solid matter content of 18.2% by mass, solution viscosity of 5.1 Pa·s, and inherent viscosity of 0.75.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 5

To a glass reaction vessel with internal volume of 500 mL that is equipped with a stirrer and an inlet • outlet for nitrogen gas, 400 g of NMP was added as a solvent. To the solvent, 26.15 g (0.242 mol) of PPD, 52.51 g (0.169 mol) of ODPA, and 21.34 g (0.073 mol) of s-BPDA were added and the mixture was stirred for 10 hours at 50° C. to obtain a binder resin composition for an electrode which has a solid matter content of 18.3% by mass, solution viscosity of 4.8 Pa·s, and inherent viscosity of 0.76.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 6

To a glass reaction vessel with internal volume of 500 mL that is equipped with a stirrer and an inlet • outlet for nitrogen gas, 400 g of NMP was added as a solvent. To the solvent, 26.36 g (0.244 mol) of PPD, 37.80 g (0.122 mol) of ODPA, and 35.85 g (0.122 mol) of s-BPDA were added and the mixture was stirred for 10 hours at 50° C. to obtain a binder resin composition for an electrode which has a solid matter content of 18.1% by mass, solution viscosity of 5.0 Pa·s, and inherent viscosity of 0.77.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 7

To a glass reaction vessel with internal volume of 500 mL that is equipped with a stirrer and an inlet • outlet for nitrogen gas, 400 g of NMP was added as a solvent. To the solvent, 26.56 g (0.246 mol) of PPD, 22.86 g (0.074 mol) of ODPA, and 50.58 g (0.172 mol) of s-BPDA were added and the mixture was stirred for 10 hours at 50° C. to obtain a binder resin composition for an electrode which has a solid matter content of 18.4% by mass, solution viscosity of 5.2 Pa·s, and inherent viscosity of 0.77.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 8

To a glass reaction vessel with internal volume of 500 mL that is equipped with a stirrer and an inlet • outlet for nitrogen gas, 400 g of NMP was added as a solvent. To the solvent, 26.77 g (0.248 mol) of PPD, 7.68 g (0.025 mol) of ODPA, and 65.55 g (0.223 mol) of s-BPDA were added and the mixture was stirred for 10 hours at 50° C. to obtain a binder resin composition for an electrode which has a solid matter content of 18.0% by mass, solution viscosity of 4.9 Pa·s, and inherent viscosity of 0.78.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 9

To a glass reaction vessel with internal volume of 500 mL that is equipped with a stirrer and an inlet • outlet for nitrogen gas, 400 g of NMP was added as a solvent. To the solvent, 29.05 g (0.268 mol) of PPD, 41.66 g (0.134 mol) of ODPA, and 29.29 g (0.134 mol) of PMDA were added and the mixture was stirred for 10 hours at 50° C. to obtain a binder resin composition for an electrode which has a solid matter content of 18.2% by mass, solution viscosity of 5.0 Pa·s, and inherent viscosity of 0.70.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 10

To a glass reaction vessel with internal volume of 500 mL that is equipped with a stirrer and an inlet • outlet for nitrogen gas, 400 g of NMP was added as a solvent. To the solvent, 12.93 g (0.120 mol) of PPD, 23.93 g (0.120 mol) of ODA, 37.07 g (0.120 mol) of ODPA, and 26.07 g (0.120 mol) of PMDA were added and the mixture was stirred for 10 hours at 50° C. to obtain a binder resin composition for an electrode which has a solid matter content of 18.1% by mass, solution viscosity of 5.1 Pa·s, and inherent viscosity of 0.68.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 11

The binder resin composition for an electrode obtained which has been obtained from the Example 6 was added with 0.1 molar equivalents of isoquinoline and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Example 12

The binder resin composition for an electrode obtained which has been obtained from the Example 6 was added with 0.1 molar equivalents of isoquinoline and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., and 10 minutes at 250° C. to form a binder resin film having a thickness of 50 μm.

Characteristics of the film obtained are shown in the Table 1.

Further, the binder resin composition for an electrode which has been obtained from the above was treated in the same manner as the Example 1 to produce appropriately an electrode.

Comparative Example 1

To a glass reaction vessel with internal volume of 500 mL that is equipped with a stirrer and an inlet • outlet for nitrogen gas, 400 g of NMP was added as a solvent. To the solvent, 26.88 g (0.249 mol) of PPD and 73.12 g (0.249 mol) of s-BPDA were added and the mixture was stirred for 10 hours at 50° C. to obtain a binder resin composition for an electrode which has a solid matter content of 18.1% by mass, solution viscosity of 5.0 Pa·s, and inherent viscosity of 0.66.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 400° C. to form a binder resin film having a thickness of 50 μm.

Characteristics of the film obtained are shown in the Table 2.

Comparative Example 2

To a glass reaction vessel with internal volume of 500 mL that is equipped with a stirrer and an inlet • outlet for nitrogen gas, 400 g of NMP was added as a solvent. To the solvent, 40.50 g (0.202 mol) of ODA and 59.50 g (0.202 mol) of s-BPDA were added and the mixture was stirred for 10 hours at 50° C. to obtain a binder resin composition for an electrode which has a solid matter content of 18.5% by mass, solution viscosity of 5.1 Pa·s, and inherent viscosity of 0.71.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 350° C. to form a binder resin film having a thickness of 50 μm.

Characteristics of the film obtained are shown in the Table 2.

Comparative Example 3

To a glass reaction vessel with internal volume of 500 mL that is equipped with a stirrer and an inlet • outlet for nitrogen gas, 400 g of NMP was added as a solvent. To the solvent, 33.15 g (0.307 mol) of PPD and 66.85 g (0.307 mol) of PMDA were added and the mixture was stirred for 10 hours at 50° C. to obtain a binder resin composition for an electrode which has a solid matter content of 18.0% by mass, solution viscosity of 5.2 Pa·s, and inherent viscosity of 0.61.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 400° C. for forming a binder resin film. However, cracks occurred and a film was not able to be obtained.

Comparative Example 4

To a glass reaction vessel with internal volume of 500 mL that is equipped with a stirrer and an inlet • outlet for nitrogen gas, 400 g of NMP was added as a solvent. To the solvent, 47.87 g (0.239 mol) of ODA and 52.13 g (0.239 mol) of PMDA were added and the mixture was stirred for 10 hours at 50° C. to obtain a binder resin composition for an electrode which has a solid matter content of 18.2% by mass, solution viscosity of 5.0 Pa·s, and inherent viscosity of 0.65.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 350° C. to form a binder resin film having a thickness of 50 μm.

Characteristics of the film obtained are shown in the Table 2.

TABLE 1

| | | Example 1 | Example 2 | Example 3 | Example 4 | Example 5 | Example 6 | Example 7 |
|---|---|---|---|---|---|---|---|---|
| Polyamic acid and solution composition | | | | | | | | |
| Acid component | ODPA (mol %) | 100 | 100 | 100 | 90 | 70 | 50 | 30 |
| | s-BPDA (mol %) | | | | 10 | 30 | 50 | 70 |
| | PMDA (mol %) | | | | | | | |
| Diamine component | PPD (mol %) | 100 | | | 100 | 100 | 100 | 100 |
| | ODA (mol %) | | 100 | | | | | |
| | BAPP (mol %) | | | 100 | | | | |
| Solvent | | NMP | NMP | NMP | NMP | NMP | NMP | NMP |
| Catalyst | Isoquinoline (molar equivalents) | | | | | | | |
| Characteristics of binder resin composition for electrode (polyamic acid solution composition) | Inherent viscosity | 0.75 | 0.78 | 0.74 | 0.75 | 0.76 | 0.77 | 0.77 |
| | Solid matter content (% by mass) | 18.1 | 18.3 | 18.5 | 18.2 | 18.3 | 18.1 | 18.4 |
| | Solution viscosity (Pa · s) | 4.9 | 5.2 | 5.0 | 5.1 | 4.8 | 5.0 | 5.2 |
| | Solution stability | ○ | ○ | ○ | ○ | ○ | ○ | ○ |
| Characteristics of binder resin (polyimide resin) | Highest heating temperature (C. °) | 400° C. | 350° C. | 350° C. | 400° C. | 400° C. | 400° C. | 400° C. |
| | Swelling degree in DMC (% by mass) | 0.7 | 0.8 | 1.2 | 0.5 | 0.7 | 0.7 | 0.6 |
| | Swelling degree in $CH_3OLi$-containing MeOH (% by mass) | 0.7 | 0.4 | 0.0 | 0.4 | 0.5 | 0.5 | 0.4 |
| | Before swelling test — Tensile strength (MPa) | 260 | 192 | 125 | 299 | 462 | 503 | 521 |
| | Elongation degree (%) | 47 | 76 | 81 | 53 | 46 | 48 | 51 |
| | Tensile modulus (GPa) | 6.3 | 3.0 | 2.7 | 6.7 | 7.9 | 8.3 | 8.6 |
| | Breaking energy ($MJ/m^3$) | 77 | 102 | 78 | 110 | 165 | 171 | 175 |
| | After DMC swelling test — Tensile strength (MPa) | 234 | 175 | 115 | 269 | 407 | 448 | 495 |
| | Elongation degree (%) | 42 | 65 | 75 | 48 | 40 | 43 | 48 |
| | Tensile modulus (GPa) | 7.7 | 3.0 | 2.6 | 6.0 | 7.0 | 7.4 | 8.6 |
| | Breaking energy ($MJ/m^3$) | 69 | 90 | 72 | 99 | 145 | 152 | 158 |
| | Retention ratio of breaking energy (%) | 90 | 88 | 92 | 90 | 88 | 89 | 90 |

TABLE 1-continued

|  |  |  |  |  |  |  |  |  |
|---|---|---|---|---|---|---|---|---|
| After CH₃OLi-containing MeOH swelling test | Tensile strength (MPa) | 226 | 164 | 114 | 254 | 388 | 433 | 484 |
|  | Elongation degree (%) | 41 | 66 | 75 | 45 | 39 | 41 | 48 |
|  | Tensile modulus (GPa) | 5.5 | 2.8 | 2.5 | 5.7 | 6.6 | 7.1 | 8.5 |
|  | Breaking energy (MJ/m³) | 67 | 88 | 71 | 93 | 139 | 147 | 154 |
|  | Retention ratio of breaking energy (%) | 87 | 86 | 91 | 85 | 84 | 86 | 88 |

|  |  | Example 8 | Example 9 | Example 10 | Example 11 | Example 12 |
|---|---|---|---|---|---|---|
| Polyamic acid and solution composition |  |  |  |  |  |  |
| Acid component | ODPA (mol %) | 10 | 50 | 50 | 50 | 50 |
|  | s-BPDA (mol %) | 90 |  |  | 50 | 50 |
|  | PMDA (mol %) |  | 50 | 50 |  |  |
| Diamine component | PPD (mol %) | 100 | 100 | 50 | 100 | 100 |
|  | ODA (mol %) |  |  | 50 |  |  |
|  | BAPP (mol %) |  |  |  |  |  |
| Solvent |  | NMP | NMP | NMP | NMP | NMP |
| Catalyst | Isoquinoline (molar equivalents) |  |  |  | 0.1 | 0.1 |
| Characteristics of binder resin composition for electrode (polyamic acid solution composition) | Inherent viscosity | 0.78 | 0.70 | 0.68 | Same as Example 6 | Same as Example 6 |
|  | Solid matter content (% by mass) | 18.0 | 18.2 | 18.1 |  |  |
|  | Solution viscosity (Pa·s) | 4.9 | 5.0 | 5.1 |  |  |
|  | Solution stability | ○ | ○ | ○ | ○ | ○ |
| Characteristics of binder resin (polyimide resin) | Highest heating temperature (C. °) | 400° C. | 400° C. | 350° C. | 400° C. | 250° C. |
|  | Swelling degree in DMC (% by mass) | 1.0 | 0.1 | 0.7 | 0.6 | 1.4 |
|  | Swelling degree in CH₃OLi-containing MeOH (% by mass) | 0.7 | 1.5 | 0.8 | 0.5 | 1.2 |
| Before swelling test | Tensile strength (MPa) | 495 | 405 | 178 | 510 | 308 |
|  | Elongation degree (%) | 38 | 48 | 98 | 49 | 45 |
|  | Tensile modulus (GPa) | 8.8 | 7.5 | 3.2 | 8.4 | 7.2 |
|  | Breaking energy (MJ/m³) | 158 | 135 | 129 | 178 | 105 |
| After DMC swelling test | Tensile strength (MPa) | 431 | 372 | 161 | 465 | 295 |
|  | Elongation degree (%) | 33 | 45 | 88 | 47 | 40 |
|  | Tensile modulus (GPa) | 7.7 | 7.3 | 3.0 | 8.0 | 6.8 |
|  | Breaking energy (MJ/m³) | 137 | 124 | 115 | 156 | 98 |
|  | Retention ratio of breaking energy (%) | 87 | 92 | 89 | 88 | 93 |
| After CH₃OLi-containing MeOH swelling test | Tensile strength (MPa) | 421 | 355 | 158 | 435 | 290 |
|  | Elongation degree (%) | 32 | 42 | 86 | 42 | 38 |
|  | Tensile modulus (GPa) | 7.5 | 7.1 | 2.9 | 7.5 | 6.7 |
|  | Breaking energy (MJ/m³) | 134 | 116 | 110 | 151 | 95 |
|  | Retention ratio of breaking energy (%) | 85 | 86 | 85 | 85 | 90 |

TABLE 2

|  |  | Comparative example 1 | Comparative example 2 | Comparative example 3 | Comparative example 4 |
|---|---|---|---|---|---|
| Polyamic acid and solution composition |  |  |  |  |  |
| Acid component | s-BPDA (mol %) | 100 | 100 |  |  |
|  | PMDA (mol %) |  |  | 100 | 100 |
| Diamine component | PPD (mol %) | 100 |  | 100 |  |
|  | ODA (mol %) |  | 100 |  | 100 |

TABLE 2-continued

| | | Comparative example 1 | Comparative example 2 | Comparative example 3 | Comparative example 4 |
|---|---|---|---|---|---|
| Solvent | | NMP | NMP | NMP | NMP |
| Characteristics of binder resin composition for electrode (polyamic acid solution composition) | Inherent viscosity | 0.66 | 0.71 | 0.61 | 0.65 |
| | Solid matter content (% by mass) | 18.1 | 18.5 | 18.0 | 18.2 |
| | Solution viscosity (Pa·s) | 5.0 | 5.1 | 5.2 | 5.0 |
| | Solution stability | ○ | ○ | x | x |
| Characteristics of binder resin (polyimide resin) | Highest heating temperature | 400° C. | 350° C. | 400° C. | 350° C. |
| | Swelling degree in DMC (% by mass) | 2.5 | 2.1 | Unable to produce a film | 3.5 |
| | Swelling degree in CH$_3$OLi-containing MeOH (% by mass) | 2.8 | 3.4 | | 3.7 |
| Before swelling test | Tensile strength (MPa) | 461 | 245 | | 270 |
| | Elongation degree (%) | 38 | 88 | | 75 |
| | Tensile modulus (GPa) | 8.6 | 3.6 | | 3.5 |
| | Breaking energy (MJ/m$^3$) | 131 | 154 | | 135 |
| After DMC swelling test | Tensile strength (MPa) | 302 | 191 | | 175 |
| | Elongation degree (%) | 24 | 60 | | 42 |
| | Tensile modulus (GPa) | 8.2 | 3.6 | | 3.3 |
| | Breaking energy (MJ/m$^3$) | 72 | 88 | | 69 |
| | Retention ratio of breaking energy (%) | 55 | 57 | | 51 |
| After CH$_3$OLi-containing MeOH swelling test | Tensile strength (MPa) | 285 | 198 | | 160 |
| | Elongation degree (%) | 21 | 65 | | 38 |
| | Tensile modulus (GPa) | 8.0 | 3.6 | | 3.1 |
| | Breaking energy (MJ/m$^3$) | 65 | 80 | | 60 |
| | Retention ratio of breaking energy (%) | 50 | 52 | | 44 |

Example 13

To a glass reaction vessel with internal volume of 500 mL that is equipped with a stirrer and an inlet • outlet for nitrogen gas, 400 g of NMP was added as a solvent. To the solvent, 37.14 g (0.185 mol) of ODA, 2.23 g (0.021 mol) of PPD, and 60.63 g (0.206 mol) of s-BPDA were added and the mixture was stirred for 10 hours at 50° C. to obtain a binder resin composition for an electrode which has a solid matter content of 18.2% by mass, solution viscosity of 4.8 Pa·s, and inherent viscosity of 0.71.

The binder resin composition for an electrode which has been obtained from the above was coated on a glass plate substrate by using a bar coater. The coated film was de-foamed and pre-dried under reduced pressure for 30 min at 25° C., and then placed in a hot air dryer in nitrogen gas atmosphere under atmospheric pressure and heated for 30 min at 120° C., 10 min at 150° C., 10 min at 200° C., 10 min at 250° C., and 10 min at 350° C. to form a binder resin film having a thickness of 50 μm.

Characteristics of the film obtained are shown in the Table 3.

Further, 4.77 g of the binder resin composition for an electrode obtained (weight of the solid matter after imidization: 0.8 g) and 9.2 g of 300 mesh silicon powder were kneaded while being smashed using a pestle and mortar to produce electrode mixture paste. The obtained paste was able to be thinly coated on a copper foil by using a glass rod. The copper foil coated with the paste was fixed on a substrate and heated in nitrogen atmosphere for 1 hr at 120° C., 10 min at 200° C., 10 min at 220° C., 10 min at 250° C., 10 min at 300° C., and 10 mins at 350° C. As a result, an electrode having an active material layer with a thickness of 100 μm was able to be produced appropriately.

Example 14

To a glass reaction vessel with internal volume of 500 mL that is equipped with a stirrer and an inlet • outlet for nitrogen gas, 400 g of NMP was added as a solvent. To the solvent, 33.65 g (0.168 mol) of ODA, 4.45 g (0.042 mol) of PPD, and 61.08 g (0.210 mol) of s-BPDA were added and the mixture was stirred for 10 hours at 50° C. to obtain a binder resin composition for an electrode which has a solid matter content of 18.0% by mass, solution viscosity of 4.9 Pa·s, and inherent viscosity of 0.69.

The binder resin composition for an electrode which has been obtained from the above was coated on a glass plate substrate by using a bar coater. The coated film was de-foamed and pre-dried under reduced pressure for 30 mins at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 3.

Further, the binder resin composition for an electrode which has been obtained from the above was treated in the same manner as the Example 13 to appropriately produce an electrode.

Example 15

To a glass reaction vessel with internal volume of 500 mL that is equipped with a stirrer and an inlet • outlet for nitrogen gas, 200 g of NMP and 200 g of DMAc were added as a solvent. To the solvent, 30.03 g (0.150 mol) of ODA, 6.95 g (0.064 mol) of PPD, and 63.02 g (0.214 mol) of s-BPDA were added and the mixture was stirred for 10 hours at 50° C. to obtain a binder resin composition for an electrode which has a solid matter content of 18.3% by mass, solution viscosity of 5.0 Pa·s, and inherent viscosity of 0.75.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 3.

Further, the binder resin composition for an electrode which has been obtained from the above was treated in the same manner as the Example 13 to appropriately produce an electrode.

Example 16

To a glass reaction vessel with internal volume of 500 mL that is equipped with a stirrer and an inlet • outlet for nitrogen gas, 400 g of NMP was added as a solvent. To the solvent, 22.33 g (0.112 mol) of ODA, 12.06 g (0.112 mol) of PPD, and 65.61 g (0.223 mol) of s-BPDA were added and the mixture was stirred for 10 hours at 50° C. to obtain a binder resin composition for an electrode which has a solid matter content of 18.5% by mass, solution viscosity of 4.9 Pa·s, and inherent viscosity of 0.66.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 3.

Further, the binder resin composition for an electrode which has been obtained from the above was treated in the same manner as the Example 13 to appropriately produce an electrode.

Example 17

To a glass reaction vessel with internal volume of 500 mL that is equipped with a stirrer and an inlet • outlet for nitrogen gas, 400 g of NMP was added as a solvent. To the solvent, 13.97 g (0.070 mol) of ODA, 17.61 g (0.163 mol) of PPD, and 68.42 g (0.233 mol) of s-BPDA were added and the mixture was stirred for 10 hours at 50° C. to obtain a binder resin composition for an electrode which has a solid matter content of 18.3% by mass, solution viscosity of 5.2 Pa·s, and inherent viscosity of 0.65.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 3.

Further, the binder resin composition for an electrode which has been obtained from the above was treated in the same manner as the Example 13 to appropriately produce an electrode.

Example 18

To a glass reaction vessel with internal volume of 500 mL that is equipped with a stirrer and an inlet • outlet for nitrogen gas, 400 g of NMP was added as a solvent. To the solvent, 9.52 g (0.048 mol) of ODA, 20.56 g (0.190 mol) of PPD, and 69.92 g (0.238 mol) of s-BPDA were added and the mixture was stirred for 10 hours at 50° C. to obtain a binder resin composition for an electrode which has a solid matter content of 18.2% by mass, solution viscosity of 4.8 Pa·s, and inherent viscosity of 0.63.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 3.

Further, the binder resin composition for an electrode which has been obtained from the above was treated in the same manner as the Example 13 to appropriately produce an electrode.

Example 19

To a glass reaction vessel with internal volume of 500 mL that is equipped with a stirrer and an inlet • outlet for nitrogen gas, 400 g of NMP was added as a solvent. To the solvent, 4.87 g (0.024 mol) of ODA, 23.65 g (0.219 mol) of PPD, and 71.48 g (0.243 mol) of s-BPDA were added and the mixture was stirred for 10 hours at 50° C. to obtain a binder resin composition for an electrode which has a solid matter content of 18.1% by mass, solution viscosity of 5.1 Pa·s, and inherent viscosity of 0.62.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200°

C., 10 minutes at 250° C., and 10 minutes at 350° C. to form a binder resin film having a thickness of 50 μm.

Characteristics of the film obtained are shown in the Table 3.

Further, the binder resin composition for an electrode which has been obtained from the above was treated in the same manner as the Example 13 to appropriately produce an electrode.

Example 20

The binder resin composition for an electrode obtained which has been obtained from the Example 13 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 3.

Further, the binder resin composition for an electrode which has been obtained from the above was treated in the same manner as the Example 13 to appropriately produce an electrode.

Example 21

To a glass reaction vessel with internal volume of 500 mL that is equipped with a stirrer and an inlet • outlet for nitrogen gas, 400 g of NMP was added as a solvent. To the solvent, 30.03 g (0.150 mol) of ODA, 6.95 g (0.064 mol) of PPD, and 63.02 g (0.214 mol) of s-BPDA were added and the mixture was stirred for 10 hours at 50° C. After cooling to 25° C., 0.1 molar equivalents of isoquinoline were added with respect to the amic acid structure of polyamic acid and stirred for 4 hours at 25° C. to obtain a binder resin composition for an electrode which has a solid matter content of 18.1% by mass, solution viscosity of 5.1 Pa·s, and inherent viscosity of 0.68.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 3.

Further, the binder resin composition for an electrode which has been obtained from the above was treated in the same manner as the Example 13 to appropriately produce an electrode.

Example 22

The binder resin composition for an electrode which has been obtained from the Example 16 was added with 0.1 molar equivalents of isoquinoline with respect to the amic acid structure of polyamic acid and the mixture was stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 3.

Further, the binder resin composition for an electrode which has been obtained from the above was treated in the same manner as the Example 13 to appropriately produce an electrode.

Example 23

The binder resin composition for an electrode which has been obtained from the Example 16 was added with 0.1 molar equivalents of quinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 4.

Further, the binder resin composition for an electrode which has been obtained from the above was treated in the same manner as the Example 13 to appropriately produce an electrode.

Example 24

The binder resin composition for an electrode which has been obtained from the Example 16 was added with 0.1 molar equivalents of quinoxaline with respect to the amic acid structure of polyamic acid and the mixture was stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 4.

Further, the binder resin composition for an electrode which has been obtained from the above was treated in the same manner as the Example 13 to appropriately produce an electrode.

Example 25

The binder resin composition for an electrode which has been obtained from the Example 17 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 4.

Further, the binder resin composition for an electrode which has been obtained from the above was treated in the same manner as the Example 13 to appropriately produce an electrode.

Example 26

The binder resin composition for an electrode which has been obtained from the Example 19 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 4.

Further, the binder resin composition for an electrode which has been obtained from the above was treated in the same manner as the Example 13 to appropriately produce an electrode.

Example 27

The binder resin composition for an electrode which has been obtained from the Example 20 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 4.

Further, the binder resin composition was treated in the same manner as the Example 13 except that the binder resin composition was heated for 30 minutes at 120° C., 10 minutes at 150° C., and 10 minutes at 200° C. to appropriately produce an electrode.

Example 28

The binder resin composition for an electrode which has been obtained from the Example 21 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 4.

Further, the binder resin composition was treated in the same manner as the Example 13 except that the binder resin composition was heated for 30 minutes at 120° C., 10 minutes at 150° C., and 10 minutes at 200° C. to appropriately produce an electrode.

Example 29

The binder resin composition for an electrode which has been obtained from the Example 22 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 4.

Further, the binder resin composition was treated in the same manner as the Example 13 except that the binder resin composition was heated for 30 minutes at 120° C., 10 minutes at 150° C., and 10 minutes at 200° C. to appropriately produce an electrode.

Example 30

The binder resin composition for an electrode which has been obtained from the Example 25 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 4.

Further, the binder resin composition was treated in the same manner as the Example 13 except that the binder resin composition was heated for 30 minutes at 120° C., 10 minutes at 150° C., and 10 minutes at 200° C. to appropriately produce an electrode.

Example 31

The binder resin composition for an electrode which has been obtained from the Example 26 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 4.

Further, the binder resin composition was treated in the same manner as the Example 13 except that the binder resin composition was heated for 30 minutes at 120° C., 10 minutes at 150° C., and 10 minutes at 200° C. to appropriately produce an electrode.

Comparative Example 5

To a glass reaction vessel with internal volume of 500 mL that is equipped with a stirrer and an inlet • outlet for nitrogen gas, 400 g of NMP was added as a solvent. To the solvent, 40.50 g (0.202 mol) of ODA and 59.50 g (0.202 mol) of s-BPDA were added and the mixture was stirred for 10 hours at 50° C. to obtain a binder resin composition for an electrode which has a solid matter content of 18.5% by mass, solution viscosity of 5.1 Pa·s, and inherent viscosity of 0.71.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 350° C. to form a binder resin film having a thickness of 50 μm.

Characteristics of the film obtained are shown in the Table 5.

Comparative Example 6

To a glass reaction vessel with internal volume of 500 mL that is equipped with a stirrer and an inlet • outlet for nitrogen gas, 400 g of NMP was added as a solvent. To the solvent, 26.88 g (0.249 mol) of PPD and 73.12 g (0.249 mol) of s-BPDA were added and the mixture was stirred for 10 hours at 50° C. to obtain a binder resin composition for an electrode which has a solid matter content of 18.0% by mass, solution viscosity of 5.0 Pa·s, and inherent viscosity of 0.61.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 400° C. to form a binder resin film having a thickness of 50 μm.

Characteristics of the film obtained are shown in the Table 5.

Comparative Example 7

The binder resin composition for an electrode which has been obtained from the Comparative example 5 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 5.

Comparative Example 8

The binder resin composition for an electrode which has been obtained from the Comparative example 6 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 400° C. to form a binder resin film having a thickness of 50 μm.

Characteristics of the film obtained are shown in the Table 5.

Comparative Example 9

The binder resin composition for an electrode which has been obtained from the Comparative example 7 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 μm.

Characteristics of the film obtained are shown in the Table 5.

Comparative Example 10

The binder resin composition for an electrode which has been obtained from the Comparative example 8 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., and 10 minutes at 200° C. to form a binder resin film having a thickness of 50 μm.

Characteristics of the film obtained are shown in the Table 5.

TABLE 3

| | | Example 13 | Example 14 | Example 15 | Example 16 | Example 17 | Example 18 |
|---|---|---|---|---|---|---|---|
| Composition of polyamic acid | | | | | | | |
| Acid component | s-BPDA (mol %) | 100 | 100 | 100 | 100 | 100 | 100 |
| Amine component | ODA (mol %) | 90 | 80 | 70 | 50 | 30 | 20 |
| | PPD (mol %) | 10 | 20 | 30 | 50 | 70 | 80 |
| Solvent | NMP (% by mass) | 100 | 100 | 50 | 100 | 100 | 100 |
| | DMAc (mol % by mass) | | | 50 | | | |
| Catalyst | Isoquinoline (molar equivalents) | | | | | | |
| | Quinoline (molar equivalents) | | | | | | |
| | Quinoxaline (molar equivalents) | | | | | | |

TABLE 3-continued

| | | | | | | | |
|---|---|---|---|---|---|---|---|
| Characteristics of binder resin composition for electrode (polyamic acid solution composition) | Inherent viscosity | 0.71 | 0.69 | 0.75 | 0.66 | 0.65 | 0.63 |
| | Solid matter content (% by mass) | 18.2 | 18.0 | 18.3 | 18.5 | 18.3 | 18.2 |
| | Solution viscosity (Pa · s) | 4.8 | 4.9 | 5.0 | 4.9 | 5.2 | 4.8 |
| | Solution stability | ○ | ○ | ○ | ○ | ○ | ○ |
| Characteristics of binder resin (polyimide resin) | Highest heating temperature (° C.) | 350° C. | 350° C. | 350° C. | 350° C. | 350° C. | 350° C. |
| | Swelling degree (% by mass) | 1.2 | 1.3 | 1.3 | 1.4 | 1.5 | 1.3 |
| Before swelling test | Tensile strength (MPa) | 270 | 305 | 329 | 403 | 448 | 432 |
| | Elongation degree (%) | 119 | 90 | 79 | 61 | 53 | 48 |
| | Tensile modulus (GPa)) | 3.9 | 4.2 | 4.4 | 5.3 | 6.8 | 7.5 |
| | Breaking energy (MJ/m³) | 206 | 185 | 171 | 161 | 156 | 140 |
| After swelling test | Tensile strength (MPa) | 245 | 277 | 301 | 385 | 412 | 391 |
| | Elongation degree (%) | 108 | 83 | 73 | 59 | 49 | 44 |
| | Tensile modulus (GPa)) | 3.8 | 4.1 | 4.2 | 5.2 | 6.6 | 7.1 |
| | Breaking energy (MJ/m³) | 175 | 165 | 150 | 138 | 130 | 125 |
| | Retention ratio of breaking energy (%) | 85 | 89 | 88 | 86 | 83 | 89 |

| | | | Example 19 | Example 20 | Example 21 | Example 22 |
|---|---|---|---|---|---|---|
| Composition of polyamic acid | | | | | | |
| Acid component | s-BPDA (mol %) | | 100 | 100 | 100 | 100 |
| Amine component | ODA (mol %) | | 10 | 90 | 70 | 50 |
| | PPD (mol %) | | 90 | 10 | 30 | 50 |
| Solvent | NMP (% by mass) | | 100 | 100 | 100 | 100 |
| | DMAc (mol % by mass) | | | | | |
| Catalyst | Isoquinoline (molar equivalents) | | | 0.1 | 0.1 | 0.1 |
| | Quinoline (molar equivalents) | | | | | |
| | Quinoxaline (molar equivalents) | | | | | |
| Characteristics of binder resin composition for electrode (polyamic acid solution composition) | Inherent viscosity | | 0.62 | 0.71 | 0.68 | 0.66 |
| | Solid matter content (% by mass) | | 18.1 | 18.2 | 18.1 | 18.5 |
| | Solution viscosity (Pa · s) | | 5.1 | 4.8 | 5.1 | 4.9 |
| | Solution stability | | ○ | ○ | ○ | ○ |
| Characteristics of binder resin (polyimide resin) | Highest heating temperature (° C.) | | 350° C. | 350° C. | 350° C. | 350° C. |
| | Swelling degree (% by mass) | | 1.5 | 1.3 | 1.2 | 1.5 |
| Before swelling test | Tensile strength (MPa) | | 421 | 311 | 329 | 407 |
| | Elongation degree (%) | | 43 | 118 | 86 | 71 |
| | Tensile modulus (GPa)) | | 8.5 | 3.7 | 4.5 | 4.9 |
| | Breaking energy (MJ/m³) | | 135 | 225 | 181 | 180 |
| After swelling test | Tensile strength (MPa) | | 375 | 287 | 303 | 360 |
| | Elongation degree (%) | | 41 | 101 | 75 | 65 |
| | Tensile modulus (GPa)) | | 8.2 | 3.5 | 4.2 | 4.7 |
| | Breaking energy (MJ/m³) | | 115 | 185 | 154 | 158 |
| | Retention ratio of breaking energy (%) | | 85 | 82 | 85 | 88 |

TABLE 4

| | | Example 23 | Example 24 | Example 25 | Example 26 | Example 27 |
|---|---|---|---|---|---|---|
| Composition of polyamic acid | | | | | | |
| Acid component | s-BPDA (mol %) | 100 | 100 | 100 | 100 | 100 |
| Amine component | ODA (mol %) | 50 | 50 | 30 | 10 | 90 |
| | PPD (mol %) | 50 | 50 | 70 | 90 | 10 |
| Solvent | NMP (% by mass) | 100 | 100 | 100 | 100 | 100 |
| | DMAc (% by mass) | | | | | |

TABLE 4-continued

|  |  |  |  |  |  |
|---|---|---|---|---|---|
| Catalyst | Isoquinoline (molar equivalents) |  |  | 0.1 | 0.1 | 0.1 |
|  | Quinoline (molar equivalents) | 0.1 |  |  |  |  |
|  | Quinoxaline (molar equivalents) |  | 0.1 |  |  |  |
| Characteristics of binder resin composition for electrode (polyamic acid solution composition) | Inherent viscosity | 0.66 | 0.66 | 0.65 | 0.62 | 0.71 |
|  | Solid matter content (% by mass) | 18.5 | 18.5 | 18.3 | 18.1 | 18.2 |
|  | Solution viscosity (Pa·s) | 4.9 | 4.9 | 5.2 | 5.1 | 4.8 |
|  | Solution stability | ○ | ○ | ○ | ○ | ○ |
| Characteristics of binder resin (polyimide resin) | Highest heating temperature (° C.) | 350° C. | 350° C. | 350° C. | 350° C. | 200° C. |
|  | Swelling degree (% by mass) | 1.3 | 1.4 | 1.6 | 1.5 | 1.7 |
| Before swelling test | Tensile strength (MPa) | 434 | 422 | 443 | 393 | 230 |
|  | Elongation degree (%) | 87 | 75 | 67 | 48 | 84 |
|  | Tensile modulus (GPa) | 5.3 | 5.3 | 5.8 | 7.1 | 3.4 |
|  | Breaking energy (MJ/m$^3$) | 240 | 201 | 192 | 137 | 125 |
|  | Tensile strength (MPa) | 401 | 382 | 390 | 350 | 201 |
|  | Elongation degree (%) | 77 | 69 | 61 | 45 | 71 |
|  | Tensile modulus (GPa) | 5.1 | 5.1 | 5.5 | 6.7 | 3.1 |
|  | Breaking energy (MJ/m$^3$) | 201 | 175 | 158 | 122 | 105 |
|  | Retention ratio of breaking energy (%) | 84 | 87 | 82 | 89 | 84 |

|  |  | Example 28 | Example 29 | Example 30 | Example 31 |
|---|---|---|---|---|---|
| Composition of polyamic acid |  |  |  |  |  |
| Acid component | s-BPDA (mol %) | 100 | 100 | 100 | 100 |
| Amine component | ODA (mol %) | 70 | 50 | 30 | 10 |
|  | PPD (mol %) | 30 | 50 | 70 | 90 |
| Solvent | NMP (% by mass) | 100 | 100 | 100 | 100 |
|  | DMAc (% by mass) |  |  |  |  |
| Catalyst | Isoquinoline (molar equivalents) | 0.1 | 0.1 | 0.1 | 0.1 |
|  | Quinoline (molar equivalents) |  |  |  |  |
|  | Quinoxaline (molar equivalents) |  |  |  |  |
| Characteristics of binder resin composition for electrode (polyamic acid solution composition) | Inherent viscosity | 0.68 | 0.66 | 0.65 | 0.62 |
|  | Solid matter content (% by mass) | 18.1 | 18.5 | 18.3 | 18.1 |
|  | Solution viscosity (Pa·s) | 5.1 | 4.9 | 5.2 | 5.1 |
|  | Solution stability | ○ | ○ | ○ | ○ |
| Characteristics of binder resin (polyimide resin) | Highest heating temperature (° C.) | 200° C. | 200° C. | 200° C. | 200° C. |
|  | Swelling degree (% by mass) | 1.9 | 1.8 | 1.7 | 1.9 |
| Before swelling test | Tensile strength (MPa) | 265 | 262 | 250 | 235 |
|  | Elongation degree (%) | 88 | 72 | 62 | 58 |
|  | Tensile modulus (GPa) | 3.9 | 4.1 | 4.4 | 4.8 |
|  | Breaking energy (MJ/m$^3$) | 146 | 132 | 130 | 125 |
|  | Tensile strength (MPa) | 235 | 236 | 223 | 215 |
|  | Elongation degree (%) | 75 | 65 | 58 | 51 |
|  | Tensile modulus (GPa) | 3.8 | 3.9 | 4.2 | 4.5 |
|  | Breaking energy (MJ/m$^3$) | 123 | 118 | 114 | 107 |
|  | Retention ratio of breaking energy (%) | 84 | 89 | 88 | 86 |

TABLE 5

|  |  | Comparative example 5 | Comparative example 6 | Comparative example 7 | Comparative example 8 | Comparative example 9 | Comparative example 10 |
|---|---|---|---|---|---|---|---|
| Composition of polyamic acid |  |  |  |  |  |  |  |
| Acid component | s-BPDA (mol %) | 100 | 100 | 100 | 100 | 100 | 100 |
| Diamine component | ODA (mol %) | 100 |  | 100 |  | 100 |  |
|  | PPD (mol %) |  | 100 |  | 100 |  | 100 |

TABLE 5-continued

| | | Comparative example 5 | Comparative example 6 | Comparative example 7 | Comparative example 8 | Comparative example 9 | Comparative example 10 |
|---|---|---|---|---|---|---|---|
| Solvent | NMP (% by mass) | 100 | 100 | 100 | 100 | 100 | 100 |
| | DMAc (% by mass) | | | | | | |
| Catalyst | Isoquinoline (molar equivalents) | | | 0.1 | 0.1 | 0.1 | 0.1 |
| | Quinoline (molar equivalents) | | | | | | |
| | Quinoxaline (molar equivalents) | | | | | | |
| Characteristics of binder resin composition for electrode (polyamic acid solution composition) | Inherent viscosity | 0.71 | 0.61 | Same as Comparative example 5 | Same as Comparative example 6 | Same as Comparative example 5 | Same as Comparative example 6 |
| | Solid matter content (% by mass) | 18.5 | 18.0 | | | | |
| | Solution viscosity (Pa·s) | 5.1 | 5.0 | | | | |
| | Solution stability | ○ | ○ | ○ | x | ○ | x |
| Characteristics of binder resin (polyimide resin) | Highest heating temperature (° C.) | 350° C. | 400° C. | 350° C. | 400° C. | 200° C. | 200° C. |
| | Swelling degree (% by mass) | 2.1 | 2.3 | 2.5 | 2.7 | 2.8 | 1.5 |
| Before swelling test | Tensile strength (MPa) | 245 | 420 | 240 | 378 | 195 | 143 |
| | Elongation degree (%) | 88 | 30 | 85 | 34 | 77 | 15 |
| | Tensile modulus (GPa)) | 3.6 | 8.1 | 3.7 | 8.2 | 3.4 | 5.5 |
| | Breaking energy (MJ/m$^3$) | 154 | 85 | 135 | 90 | 96 | 48 |
| After swelling test | Tensile strength (MPa) | 191 | 380 | 182 | 332 | 132 | 150 |
| | Elongation degree (%) | 60 | 32 | 62 | 31 | 61 | 21 |
| | Tensile modulus (GPa)) | 3.6 | 7.7 | 3.6 | 7.9 | 2.6 | 4.9 |
| | Breaking energy (MJ/m$^3$) | 88 | 56 | 85 | 62 | 56 | 28 |
| | Retention ratio of breaking energy (%) | 57 | 66 | 63 | 69 | 58 | 58 |

Example 32

To a glass reaction vessel with internal volume of 500 mL that is equipped with a stirrer and an inlet • outlet for nitrogen gas, 400 g of NMP was added as a solvent. To the solvent, 58.25 g (0.142 mol) of BAPP and 41.75 g (0.142 mol) of s-BPDA were added and the mixture was stirred for 10 hours at 50° C. to obtain a binder resin composition for an electrode which has a solid matter content of 18.5% by mass, solution viscosity of 5.1 Pa·s, and inherent viscosity of 0.75.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, 4.77 g of the binder resin composition for an electrode obtained (weight of the solid matter after imidization: 0.8 g) and 9.2 g of 300 mesh silicon powder were kneaded while being smashed using a pestle and mortar to produce electrode mixture paste. The obtained paste was able to be thinly coated on a copper foil by using a glass rod. The copper foil coated with the paste was fixed on a substrate and heated in nitrogen atmosphere for 1 hr at 120° C., 10 minutes at 200° C., 10 minutes at 220° C., 10 minutes at 250° C., 10 minutes at 300° C., and 10 minutes at 350° C. As a result, an electrode having an active material layer with a thickness of 100 μm was able to be produced appropriately.

Example 33

To a glass reaction vessel with internal volume of 500 mL that is equipped with a stirrer and an inlet • outlet for nitrogen gas, 400 g of NMP was added as a solvent. To the solvent, 2.93 g (0.015 mol) of ODA, 54.04 g (0.132 mol) of BAPP, and 43.03 g (0.147 mol) of s-BPDA were added and the mixture was stirred for 10 hours at 50° C. to obtain a binder resin composition for an electrode which has a solid matter content of 18.3% by mass, solution viscosity of 4.9 Pa·s, and inherent viscosity of 0.71.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 34

To a glass reaction vessel with internal volume of 500 mL that is equipped with a stirrer and an inlet • outlet for nitrogen gas, 400 g of NMP was added as a solvent. To the solvent, 6.04 g (0.030 mol) of ODA, 49.56 g (0.121 mol) of BAPP, and 44.40 g (0.151 mol) of s-BPDA were added and the mixture was stirred for 10 hours at 50° C. to obtain a binder resin composition for an electrode which has a solid matter content of 18.34% by mass, solution viscosity of 5.3 Pa·s, and inherent viscosity of 0.73.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 35

To a glass reaction vessel with internal volume of 500 mL that is equipped with a stirrer and an inlet • outlet for nitrogen gas, 400 g of NMP was added as a solvent. To the solvent, 9.36 g (0.047 mol) of ODA, 44.78 g (0.109 mol) of BAPP, and 45.85 g (0.156 mol) of s-BPDA were added and the mixture was stirred for 10 hours at 50° C. to obtain a binder resin composition for an electrode which has a solid matter content of 18.5% by mass, solution viscosity of 5.2 Pa·s, and inherent viscosity of 0.69.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 36

To a glass reaction vessel with internal volume of 500 mL that is equipped with a stirrer and an inlet • outlet for nitrogen gas, 400 g of NMP was added as a solvent. To the solvent, 16.70 g (0.083 mol) of ODA, 34.23 g (0.083 mol) of BAPP, and 49.07 g (0.166 mol) of s-BPDA were added and the mixture was stirred for 10 hours at 50° C. to obtain a binder resin composition for an electrode which has a solid matter content of 18.4% by mass, solution viscosity of 5.0 Pa·s, and inherent viscosity of 0.68.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 37

To a glass reaction vessel with internal volume of 500 mL that is equipped with a stirrer and an inlet • outlet for nitrogen gas, 400 g of NMP was added as a solvent. To the solvent, 55.60 g (0.151 mol) of BAPB and 44.40 g (0.151 mol) of s-BPDA were added and the mixture was stirred for 10 hours at 50° C. to obtain a binder resin composition for an electrode which has a solid matter content of 18.6% by mass, solution viscosity of 5.1 Pa·s, and inherent viscosity of 0.77.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 38

To a glass reaction vessel with internal volume of 500 mL that is equipped with a stirrer and an inlet • outlet for nitrogen gas, 400 g of NMP was added as a solvent. To the solvent, 59.51 g (0.138 mol) of BAPS and 40.49 g (0.138 mol) of s-BPDA were added and the mixture was stirred for 10 hours at 50° C. to obtain a binder resin composition for an electrode which has a solid matter content of 18.8% by mass, solution viscosity of 4.9 Pa·s, and inherent viscosity of 0.79.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 39

To a glass reaction vessel with internal volume of 500 mL that is equipped with a stirrer and an inlet • outlet for nitrogen gas, 400 g of NMP was added as a solvent. To the solvent, 53.91 g (0.131 mol) of BAPP, 3.16 g (0.015 mol) of HAB, and 42.93 g (0.146 mol) of s-BPDA were added and the mixture was stirred for 10 hours at 50° C. to obtain a binder resin composition for an electrode which has a solid matter content of 18.6% by mass, solution viscosity of 5.0 Pa·s, and inherent viscosity of 0.68.

The binder resin composition for an electrode which has been obtained from the above was coated on a glass plate substrate by using a bar coater. The coated film was defoamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 40

To a glass reaction vessel with internal volume of 500 mL that is equipped with a stirrer and an inlet • outlet for nitrogen gas, 400 g of NMP was added as a solvent. To the solvent, 44.45 g (0.108 mol) of BAPP, 10.04 g (0.047 mol) of HAB, and 45.51 g (0.155 mol) of s-BPDA were added and the mixture was stirred for 10 hours at 50° C. to obtain a binder resin composition for an electrode which has a solid matter content of 18.5% by mass, solution viscosity of 4.8 Pa·s, and inherent viscosity of 0.66.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 41

To a glass reaction vessel with internal volume of 500 mL that is equipped with a stirrer and an inlet • outlet for nitrogen gas, 400 g of NMP was added as a solvent. To the solvent, 33.78 g (0.082 mol) of BAPP, 17.79 g (0.082 mol) of HAB, and 48.42 g (0.164 mol) of s-BPDA were added and the mixture was stirred for 10 hours at 50° C. to obtain a binder resin composition for an electrode which has a solid matter content of 18.5% by mass, solution viscosity of 5.2 Pa·s, and inherent viscosity of 0.65.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 6.

Further, the binder resin composition for an electrode which has been obtained from the above was treated in the same manner as the Example 32 to appropriately produce an electrode.

Example 42

The binder resin composition for an electrode which has been obtained from the Example 32 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 7.

Further, the binder resin composition for an electrode which has been obtained from the above was treated in the same manner as the Example 32 to appropriately produce an electrode.

Example 43

The binder resin composition for an electrode which has been obtained from the Example 33 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 7.

Further, the binder resin composition for an electrode which has been obtained from the above was treated in the same manner as the Example 32 to appropriately produce an electrode.

Example 44

The binder resin composition for an electrode which has been obtained from the Example 35 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 7.

Further, the binder resin composition for an electrode which has been obtained from the above was treated in the same manner as the Example 32 to appropriately produce an electrode.

Example 45

The binder resin composition for an electrode which has been obtained from the Example 36 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 7.

Further, the binder resin composition for an electrode which has been obtained from the above was treated in the same manner as the Example 32 to appropriately produce an electrode.

Example 46

The binder resin composition for an electrode which has been obtained from the Example 39 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 7.

Further, the binder resin composition for an electrode which has been obtained from the above was treated in the same manner as the Example 32 to appropriately produce an electrode.

Example 47

The binder resin composition for an electrode which has been obtained from the Example 40 was added with 0.1 molar equivalents of isoquinoline with respect to the amic acid structure of polyamic acid and stirred for 4 hours at 25° C. The resulting binder resin composition for an electrode was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 µm.

Characteristics of the film obtained are shown in the Table 7.

Further, the binder resin composition for an electrode which has been obtained from the above was treated in the same manner as the Example 32 to appropriately produce an electrode.

Example 48

The binder resin composition for an electrode which has been obtained from the Example 42 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 µm.

Characteristics of the film obtained are shown in the Table 7.

Further, the binder resin composition was treated in the same manner as the Example 32 except that the binder resin composition was heated for 30 minutes at 120° C., 10 minutes at 150° C., and 10 minutes at 200° C. to appropriately produce an electrode.

Example 49

The binder resin composition for an electrode which has been obtained from the Example 43 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 µm.

Characteristics of the film obtained are shown in the Table 7.

Further, the binder resin composition was treated in the same manner as the Example 32 except that the binder resin composition was heated for 30 minutes at 120° C., 10 minutes at 150° C., and 10 minutes at 200° C. to appropriately produce an electrode.

Example 50

The binder resin composition for an electrode which has been obtained from the Example 44 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 µm.

Characteristics of the film obtained are shown in the Table 7.

Further, the binder resin composition was treated in the same manner as the Example 32 except that the binder resin composition was heated for 30 minutes at 120° C., 10 minutes at 150° C., and 10 minutes at 200° C. to appropriately produce an electrode.

Example 51

The binder resin composition for an electrode which has been obtained from the Example 45 was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., and 10 minutes at 200° C. to form a binder resin film having a thickness of 50 µm.

Characteristics of the film obtained are shown in the Table 7.

Further, the binder resin composition was treated in the same manner as the Example 32 except that the binder resin composition was heated for 30 minutes at 120° C., 10 minutes at 150° C., and 10 minutes at 200° C. to appropriately produce an electrode.

Comparative Example 11

To a glass reaction vessel with internal volume of 500 mL that is equipped with a stirrer and an inlet • outlet for nitrogen gas, 400 g of NMP was added as a solvent. To the solvent, 40.50 g (0.202 mol) of ODA and 59.50 g (0.202 mol) of s-BPDA were added and the mixture was stirred for 10 hours at 50° C. to obtain a binder resin composition for an electrode which has a solid matter content of 18.5% by mass, solution viscosity of 5.1 Pa·s, and inherent viscosity of 0.71.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 350° C. to form a binder resin film having a thickness of 50 μm.

Characteristics of the film obtained are shown in the Table 8.

Comparative Example 12

To a glass reaction vessel with internal volume of 500 mL that is equipped with a stirrer and an inlet • outlet for nitrogen gas, 400 g of NMP was added as a solvent. To the solvent, 42.36 g (0.196 mol) of HAB and 57.64 g (0.196 mol) of s-BPDA were added and the mixture was stirred for 10 hours at 50° C. to obtain a binder resin composition for an electrode which has a solid matter content of 18.7% by mass, solution viscosity of 4.8 Pa·s, and inherent viscosity of 0.65.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 60 minutes at 120° C., 30 minutes at 150° C., 10 minutes at 200° C., 10 minutes at 250° C., and 10 minutes at 350° C. to form a binder resin film having a thickness of 50 μm.

Characteristics of the film obtained are shown in the Table 8.

Comparative Example 13

To a glass reaction vessel with internal volume of 500 mL that is equipped with a stirrer and an inlet • outlet for nitrogen gas, 400 g of NMP was added as a solvent. To the solvent, 25.14 g (0.126 mol) of ODA, 22.09 g (0.054 mol) of BAPP, and 52.77 g (0.180 mol) of s-BPDA were added and the mixture was stirred for 10 hours at 50° C. to obtain a binder resin composition for an electrode which has a solid matter content of 18.0% by mass, solution viscosity of 4.9 Pa·s, and inherent viscosity of 0.69.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 8.

Comparative Example 14

To a glass reaction vessel with internal volume of 500 mL that is equipped with a stirrer and an inlet • outlet for nitrogen gas, 400 g of NMP was added as a solvent. To the solvent, 17.86 g (0.089 mol) of ODA, 21.96 g (0.053 mol) of BAPP, 7.71 g (0.036 mol) of HAB, and 52.47 g (0.178 mol) of s-BPDA were added and the mixture was stirred for 10 hours at 50° C. to obtain a binder resin composition for an electrode which has a solid matter content of 18.3% by mass, solution viscosity of 5.0 Pa·s, and inherent viscosity of 0.62.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 8.

Comparative Example 15

To a glass reaction vessel with internal volume of 500 mL that is equipped with a stirrer and an inlet • outlet for nitrogen gas, 400 g of NMP was added as a solvent. To the solvent, 21.65 g (0.053 mol) of BAPP, 26.61 g (0.123 mol) of HAB, and 51.73 g (0.176 mol) of s-BPDA were added and the mixture was stirred for 10 hours at 50° C. to obtain a binder resin composition for an electrode which has a solid matter content of 18.6% by mass, solution viscosity of 4.8 Pa·s, and inherent viscosity of 0.68.

The binder resin composition for an electrode which has been obtained from the above was coated on a glass plate substrate by using a bar coater. The coated film was de-foamed and pre-dried under reduced pressure for 30 minutes at 25° C., and then placed in a hot air dryer in nitrogen gas atmosphere under atmospheric pressure and heated for 30 minutes at 120° C., 10 minutes at 150° C., 10 minutes at 200° C., 10 minutes at 250° C., and 10 minutes at 350° C. to form a binder resin film having a thickness of 50 μm.

Characteristics of the film obtained are shown in the Table 8.

TABLE 6

| | | Example 32 | Example 33 | Example 34 | Example 35 | Example 36 | Example 37 |
|---|---|---|---|---|---|---|---|
| Polyamic acid and solution composition | | | | | | | |
| Acid component | s-BPDA (mol %) | 100 | 100 | 100 | 100 | 100 | 100 |
| Diamine component | PAPP (mol %) | 100 | 90 | 80 | 70 | 50 | |
| | PAPB (mol %) | | | | | | 100 |
| | BAPS (mol %) | | | | | | |
| | ODA (mol %) | | 10 | 20 | 30 | 50 | |
| | HAB (mol %) | | | | | | |

TABLE 6-continued

| Solvent | | NMP | NMP | NMP | NMP | NMP | NMP |
|---|---|---|---|---|---|---|---|
| Catalyst | Isoquinoline (molar equivalents) | | | | | | |
| Characteristics of binder resin composition for electrode (polyamic acid solution composition) | Inherent viscosity | 0.75 | 0.71 | 0.73 | 0.69 | 0.68 | 0.77 |
| | Solid matter content (% by mass) | 18.5 | 18.3 | 18.4 | 18.5 | 18.4 | 18.6 |
| | Solution viscosity (Pa·s) | 5.1 | 4.9 | 5.3 | 5.2 | 5.0 | 5.1 |
| | Solution stability | ○ | ○ | ○ | ○ | ○ | ○ |
| Characteristics of binder resin (polyimide resin) | Highest heating temperature (°C.) | 350° C. | 350° C. | 350° C. | 350° C. | 350° C. | 350° C. |
| | Swelling degree in DMC (% by mass) | 0.1 | 0.3 | 0.5 | 0.5 | 0.6 | 0.3 |
| | Swelling degree in $CH_3OLi$-containing MeOH (% by mass) | 1.4 | 1.4 | 1.5 | 1.6 | 1.8 | 0.4 |
| Before swelling test | Tensile strength (MPa) | 156 | 163 | 172 | 185 | 190 | 175 |
| | Elongation degree (%) | 103 | 100 | 102 | 98 | 101 | 73 |
| | Tensile modulus (GPa)) | 2.8 | 2.9 | 3.1 | 3.3 | 3.4 | 3.1 |
| | Breaking energy ($MJ/m^3$) | 113 | 120 | 125 | 124 | 127 | 100 |
| After DMC swelling test | Tensile strength (MPa) | 138 | 147 | 155 | 167 | 171 | 170 |
| | Elongation degree (%) | 100 | 90 | 92 | 88 | 91 | 70 |
| | Tensile modulus (GPa)) | 2.8 | 2.6 | 2.8 | 3.0 | 3.1 | 3.1 |
| | Breaking energy ($MJ/m^3$) | 100 | 98 | 104 | 101 | 104 | 95 |
| | Retention ratio of breaking energy (%) | 88 | 82 | 83 | 81 | 82 | 95 |
| After $CH_3OLi$-containing MeOH swelling test | Tensile strength (MPa) | 132 | 140 | 143 | 148 | 152 | 165 |
| | Elongation degree (%) | 94 | 80 | 85 | 83 | 82 | 65 |
| | Tensile modulus (GPa)) | 2.8 | 2.8 | 3.1 | 3.2 | 3.3 | 3.2 |
| | Breaking energy ($MJ/m^3$) | 92 | 88 | 85 | 84 | 88 | 83 |
| | Retention ratio of breaking energy (%) | 81 | 73 | 68 | 69 | 69 | 83 |

| | | Example 38 | Example 39 | Example 40 | Example 41 |
|---|---|---|---|---|---|
| Polyamic acid and solution composition | | | | | |
| Acid component | s-BPDA (mol %) | 100 | 100 | 100 | 100 |
| Diamine component | PAPP (mol %) | | 90 | 70 | 50 |
| | PAPB (mol %) | | | | |
| | BAPS (mol %) | 100 | | | |
| | ODA (mol %) | | | | |
| | HAB (mol %) | | 10 | 30 | 50 |
| Solvent | | NMP | NMP | NMP | NMP |
| Catalyst | Isoquinoline (molar equivalents) | | | | |
| Characteristics of binder resin composition for electrode (polyamic acid solution composition) | Inherent viscosity | 0.79 | 0.68 | 0.66 | 0.65 |
| | Solid matter content (% by mass) | 18.8 | 18.6 | 18.5 | 18.5 |
| | Solution viscosity (Pa·s) | 4.9 | 5.0 | 4.8 | 5.2 |
| | Solution stability | ○ | ○ | ○ | ○ |
| Characteristics of binder resin (polyimide resin) | Highest heating temperature (°C.) | 350° C. | 350° C. | 350° C. | 350° C. |
| | Swelling degree in DMC (% by mass) | 0.7 | 0.2 | 0.2 | 0.3 |
| | Swelling degree in $CH_3OLi$-containing MeOH (% by mass) | 1.8 | 1.5 | 1.2 | 2.2 |
| Before swelling test | Tensile strength (MPa) | 130 | 145 | 138 | 135 |
| | Elongation degree (%) | 65 | 52 | 40 | 38 |
| | Tensile modulus (GPa)) | 3.3 | 3.3 | 3.6 | 3.8 |
| | Breaking energy ($MJ/m^3$) | 68 | 65 | 63 | 61 |
| After DMC swelling test | Tensile strength (MPa) | 122 | 136 | 126 | 127 |
| | Elongation degree (%) | 58 | 45 | 37 | 37 |
| | Tensile modulus (GPa)) | 3.2 | 3.1 | 3.8 | 3.6 |

TABLE 6-continued

|  |  |  |  |  |  |  |
|---|---|---|---|---|---|---|
|  |  | Breaking energy (MJ/m³) | 61 | 58 | 55 | 54 |
|  |  | Retention ratio of breaking energy (%) | 90 | 89 | 87 | 89 |
|  | After CH₃OLi-containing MeOH swelling test | Tensile strength (MPa) | 118 | 133 | 114 | 120 |
|  |  | Elongation degree (%) | 60 | 48 | 38 | 34 |
|  |  | Tensile modulus (GPa) | 3.2 | 3.2 | 3.6 | 3.7 |
|  |  | Breaking energy (MJ/m³) | 60 | 53 | 53 | 51 |
|  |  | Retention ratio of breaking energy (%) | 88 | 82 | 84 | 84 |

TABLE 7

|  |  | Example 42 | Example 43 | Example 44 | Example 45 | Example 46 | Example 47 |
|---|---|---|---|---|---|---|---|
| Polyamic acid and solution composition |  |  |  |  |  |  |  |
| Acid component | s-BPDA (mol %) | 100 | 100 | 100 | 100 | 100 | 100 |
| Diamine component | PAPP (mol %) | 100 | 90 | 70 | 50 | 90 | 70 |
|  | PAPB (mol %) |  |  |  |  |  |  |
|  | BAPS (mol %) |  |  |  |  |  |  |
|  | ODA (mol %) |  | 10 | 30 | 50 |  |  |
|  | HAB (mol %) |  |  |  |  | 10 | 30 |
| Solvent |  | NMP | NMP | NMP | NMP | NMP | NMP |
| Catalyst | Isoquinoline (molar equivalents) | 0.1 | 0.1 | 0.1 | 0.1 | 0.1 | 0.1 |
| Characteristics of binder resin composition for electrode (polyamic acid solution composition) | Inherent viscosity | Same as example 32 | Same as example 32 | Same as example 32 | Same as example 32 | Same as example 32 | Same as example 32 |
|  | Solid matter content (% by mass) |  |  |  |  |  |  |
|  | Solution viscosity (Pa · s) |  |  |  |  |  |  |
|  | Solution stability | ○ | ○ | ○ | ○ | ○ | ○ |
| Characteristics of binder resin (polyimide resin) | Highest heating temperature (° C.) | 350° C. | 350° C. | 350° C. | 350° C. | 350° C. | 350° C. |
|  | Swelling degree in DMC (% by mass) | 0.2 | 0.4 | 0.5 | 0.5 | 0.3 | 0.5 |
|  | Swelling degree in CH₃OLi-containing MeOH (% by mass) | 1.8 | 1.6 | 1.5 | 1.7 | 1.9 | 1.8 |
|  | Before swelling test — Tensile strength (MPa) | 114 | 160 | 170 | 173 | 155 | 142 |
|  | Elongation degree (%) | 66 | 90 | 88 | 92 | 50 | 38 |
|  | Tensile modulus (GPa) | 2.8 | 2.9 | 3.3 | 3.4 | 3.4 | 3.7 |
|  | Breaking energy (MJ/m³) | 108 | 101 | 108 | 105 | 65 | 58 |
|  | After DMC swelling test — Tensile strength (MPa) | 122 | 141 | 163 | 169 | 133 | 128 |
|  | Elongation degree (%) | 103 | 85 | 87 | 83 | 43 | 38 |
|  | Tensile modulus (GPa) | 2.9 | 2.6 | 3.0 | 3.2 | 3.3 | 3.8 |
|  | Breaking energy (MJ/m³) | 81 | 88 | 85 | 82 | 55 | 54 |
|  | Retention ratio of breaking energy (%) | 75 | 87 | 79 | 78 | 85 | 93 |
|  | After CH₃OLi-containing MeOH swelling test — Tensile strength (MPa) | 127 | 135 | 150 | 153 | 130 | 118 |
|  | Elongation degree (%) | 79 | 85 | 80 | 81 | 40 | 39 |
|  | Tensile modulus (GPa) | 2.9 | 2.6 | 3.0 | 3.1 | 3.2 | 3.6 |
|  | Breaking energy (MJ/m³) | 85 | 80 | 78 | 79 | 51 | 52 |
|  | Retention ratio of breaking energy (%) | 79 | 79 | 72 | 75 | 78 | 90 |

TABLE 7-continued

|  |  | Example 48 | Example 49 | Example 50 | Example 51 |
|---|---|---|---|---|---|
| Polyamic acid and solution composition |  |  |  |  |  |
| Acid component | s-BPDA (mol %) | 100 | 100 | 100 | 100 |
| Diamine component | PAPP (mol %) | 100 | 90 | 70 | 50 |
|  | PAPB (mol %) |  |  |  |  |
|  | BAPS (mol %) |  |  |  |  |
|  | ODA (mol %) |  | 10 | 30 | 50 |
|  | HAB (mol %) |  |  |  |  |
| Solvent |  | NMP | NMP | NMP | NMP |
| Catalyst | Isoquinoline (molar equivalents) | 0.1 | 0.1 | 0.1 | 0.1 |
| Characteristics of binder resin composition for electrode (polyamic acid solution composition) | Inherent viscosity | Same as example 32 | Same as example 32 | Same as example 32 | Same as example 32 |
|  | Solid matter content (% by mass) |  |  |  |  |
|  | Solution viscosity (Pa·s) |  |  |  |  |
|  | Solution stability | ○ | ○ | ○ | ○ |
| Characteristics of binder resin (polyimide resin) | Highest heating temperature (°C.) | 200° C. | 200° C. | 200° C. | 200° C. |
|  | Swelling degree in DMC (% by mass) | 0.8 | 1.2 | 1.4 | 1.5 |
|  | Swelling degree in $CH_3OLi$-containing MeOH (% by mass) | 0.8 | 2.0 | 1.9 | 1.9 |
| Before swelling test | Tensile strength (MPa) | 122 | 145 | 148 | 141 |
|  | Elongation degree (%) | 109 | 83 | 80 | 81 |
|  | Tensile modulus (GPa)) | 2.8 | 2.7 | 2.9 | 2.8 |
|  | Breaking energy ($MJ/m^3$) | 95 | 81 | 79 | 78 |
| After DMC swelling test | Tensile strength (MPa) | 118 | 135 | 140 | 142 |
|  | Elongation degree (%) | 95 | 70 | 77 | 74 |
|  | Tensile modulus (GPa)) | 2.7 | 2.6 | 3.1 | 3.3 |
|  | Breaking energy ($MJ/m^3$) | 70 | 65 | 60 | 68 |
|  | Retention ratio of breaking energy (%) | 74 | 80 | 76 | 87 |
| After $CH_3OLi$-containing MeOH swelling test | Tensile strength (MPa) | 115 | 130 | 138 | 132 |
|  | Elongation degree (%) | 100 | 65 | 69 | 66 |
|  | Tensile modulus (GPa)) | 2.7 | 2.5 | 3.0 | 3.2 |
|  | Breaking energy ($MJ/m^3$) | 78 | 65 | 62 | 58 |
|  | Retention ratio of breaking energy (%) | 82 | 80 | 78 | 74 |

TABLE 8

|  |  | Comparative example 11 | Comparative example 12 | Comparative example 13 | Comparative example 14 | Comparative example 15 |
|---|---|---|---|---|---|---|
| Polyamic acid and solution composition |  |  |  |  |  |  |
| Acid component | s-BPDA (mol %) | 100 | 100 | 100 | 100 | 100 |
| Diamine component | BAPP (mol %) |  |  | 30 | 30 | 30 |
|  | ODA (mol %) | 100 |  | 70 | 50 |  |
|  | HAB (mol %) |  | 100 |  | 20 | 70 |
| Solvent |  | NMP | NMP | NMP | NMP | NMP |
| Characteristics of binder resin composition for electrode (polyamic acid solution composition) | Inherent viscosity | 0.71 | 0.65 | 0.69 | 0.62 | 0.68 |
|  | Solid matter content (% by mass) | 18.5 | 18.7 | 18.0 | 18.3 | 18.6 |
|  | Solution viscosity (Pa·s) | 5.1 | 4.8 | 4.9 | 5.0 | 4.8 |
|  | Solution stability | ○ | x | ○ | x | x |
| Characteristics of binder resin (polyimide resin) | Highest heating temperature (°C.) | 350° C. | 350° C. | 350° C. | 350° C. | 350° C. |
|  | Swelling degree in DMC (% by mass) | 2.1 | 2.5 | 2.1 | 1.4 | 2.3 |
|  | Swelling degree in $CH_3OLi$-containing MeOH (% by mass) | 3.4 | 4.2 | 3.2 | 6.1 | 3.5 |
| Before swelling test | Tensile strength (MPa) | 245 | 287 | 185 | 132 | 128 |
|  | Elongation degree (%) | 88 | 25 | 98 | 65 | 32 |

TABLE 8-continued

|  |  | Comparative example 11 | Comparative example 12 | Comparative example 13 | Comparative example 14 | Comparative example 15 |
|---|---|---|---|---|---|---|
|  | Tensile modulus (GPa)) | 3.6 | 7.2 | 3.2 | 3.0 | 4.1 |
|  | Breaking energy (MJ/m³) | 154 | 75 | 114 | 82 | 68 |
| After DMC swelling test | Tensile strength (MPa) | 191 | 185 | 138 | 118 | 101 |
|  | Elongation degree (%) | 60 | 18 | 80 | 52 | 32 |
|  | Tensile modulus (GPa)) | 3.6 | 6.5 | 3.1 | 2.9 | 3.8 |
|  | Breaking energy (MJ/m³) | 88 | 34 | 56 | 38 | 39 |
|  | Retention ratio of breaking energy (%) | 57 | 45 | 49 | 46 | 57 |
| After CH₃OLi-containing MeOH swelling test | Tensile strength (MPa) | 198 | 165 | 133 | 110 | 103 |
|  | Elongation degree (%) | 65 | 16 | 75 | 41 | 25 |
|  | Tensile modulus (GPa)) | 3.6 | 6.8 | 3.0 | 2.7 | 4.2 |
|  | Breaking energy (MJ/m³) | 80 | 29 | 45 | 35 | 38 |
|  | Retention ratio of breaking energy (%) | 52 | 39 | 39 | 43 | 56 |

INDUSTRIAL APPLICABILITY

According to the invention, a binder resin composition for an electrode having a new chemical structure, which exhibits low degree of swelling and high toughness (high breaking elongation and high breaking energy) even under a battery environment and therefore is useful as a binder for an electrode of an electrochemical element like a lithium ion secondary battery and an electric double layer capacitor, can be provided.

The invention claimed is:

1. A binder resin composition for an electrode, comprising:
   a polyamic acid having a repeating unit represented by chemical formula (1);
   pyridine compounds; and
   a solvent, Chemical Formula (1)

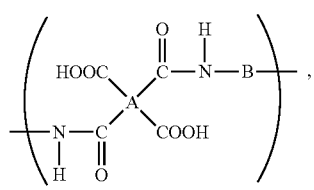

wherein A and B in chemical formula (1) are as defined below in (i), (ii), or (iii):
(i) 10 to 90 mol % of A in the repeating unit is a tetravalent group represented by chemical formula (2), and
   90 to 10 mol % of A in the repeating unit is a tetravalent group represented by chemical formula (3) and/or chemical formula (4), and
   10 to 90 mol % of B in the repeating unit is a divalent group represented by chemical formula (5), and
   90 to 10 mol % of B in the repeating unit is a divalent group represented by chemical formula (6); or
(ii) A is a tetravalent group represented by chemical formula (3),
   10 to 90 mol % of B in the repeating unit is a divalent group represented by chemical formula (6), and
   90 to 10 mol % of B in the repeating unit is a divalent group represented by chemical formula (5); or
(iii) A is a tetravalent group represented by chemical formula (3) and
   40 mol % or more of B in the repeating unit is a divalent group represented by chemical formula (7), Chemical Formula (2)

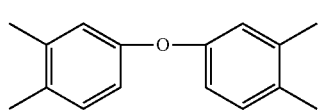

Chemical Formula (3)

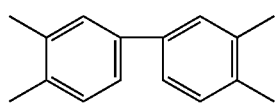

Chemical Formula (4)

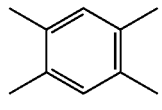

Chemical Formula (5)

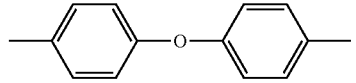

Chemical Formula (6)

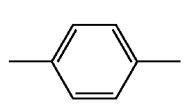

Chemical Formula (7)

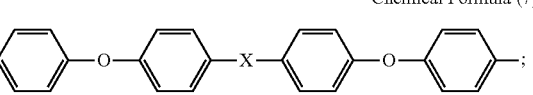

with the proviso that, in the chemical formula (7), X represents any one of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfone diphenoxy group.

2. The binder resin composition according to claim 1, wherein

A and B are as defined in (iii), 50 to 90 mol % of B in the repeating unit is a divalent group represented by the chemical formula (7), and 50 to 10 mol % of B in the repeating unit is a divalent group represented by the chemical formula (5) and/or chemical formula (8)

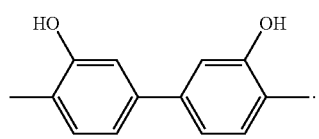

Chemical Formula (8)

3. An electrode mixture paste comprising an electrode active material and the binder resin composition for an electrode according to claim 2.

4. The binder resin composition according to claim 1, wherein

A and B are as defined in (i), and the binder resin obtained by heating exhibits weight increase of 2% by mass or less when being impregnated in dimethyl carbonate at 25° C. for 24 hours.

5. An electrode mixture paste comprising an electrode active material and the binder resin composition for an electrode according to claim 4.

6. The binder resin composition according to claim 1, wherein

A and B are as defined in (ii) and the binder resin obtained by heating exhibits weight increase of 3% by mass or less when being impregnated in dimethyl carbonate at 25° C. for 24 hours.

7. The binder resin composition according to claim 1, wherein

A and B are as defined in (i), and the binder resin obtained by heating exhibits tensile energy to break of 70 MJ/m$^3$ or more, retention ratio of the tensile energy to break of 70% or more after it is impregnated in dimethyl carbonate at 25° C. for 24 hours, and retention ratio of the tensile energy to break of 70% or more after being impregnated in a lithium alkoxides solution.

8. The binder resin composition according to claim 1, wherein

A and B are as defined in (ii), and the binder resin obtained by heating exhibits tensile energy to break of 100 MJ/m$^3$ or more and retention ratio of the tensile energy to break of 70% or more after being impregnated in dimethyl carbonate at 25° C. for 24 hours.

9. The binder resin composition according to claim 1, wherein

A and B are as defined in (iii), and the binder resin obtained by heating exhibits tensile energy to break of 50 MJ/m$^3$ or more, retention ratio of the tensile energy to break of 70% or more after it is impregnated in dimethyl carbonate at 25° C. for 24 hours, and retention ratio of the tensile energy to break of 60% or more after being impregnated in a lithium alkoxides solution.

10. An electrode mixture paste comprising an electrode active material and the binder resin composition for an electrode according to claim 1.

11. The electrode mixture paste according to claim 10, wherein the electrode active material is carbon powder, silicon powder, tin powder, or powder of an alloy comprising silicon or tin.

12. An electrode obtained by coating the electrode mixture paste according to claim 10 on a current collector and carrying out an imidization reaction while simultaneously removing the solvent by heating.

13. The electrode according to claim 12, wherein the heating is performed at a temperature of 250° C. or less.

14. The electrode according to claim 12, wherein the electrode is a negative electrode for a lithium ion secondary battery.

15. The binder resin composition according to claim 1, wherein

A and B are as defined in (iii), and the binder resin obtained by heating exhibits weight increase of 3% by mass or less when being impregnated in dimethyl carbonate at 25° C. for 24 hours.

* * * * *